United States Patent
Downs et al.

(10) Patent No.: US 9,511,666 B2
(45) Date of Patent: *Dec. 6, 2016

(54) DISCONNECTABLE DRIVELINE FOR ALL-WHEEL DRIVE VEHICLE

(71) Applicant: American Axle & Manufacturing, Inc., Detroit, MI (US)

(72) Inventors: James P. Downs, South Lyon, MI (US); Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/732,947

(22) Filed: Jun. 8, 2015

(65) Prior Publication Data

US 2015/0266374 A1    Sep. 24, 2015

Related U.S. Application Data

(63) Continuation of application No. 14/244,158, filed on Apr. 3, 2014, now Pat. No. 9,074,672, which is a
(Continued)

(51) Int. Cl.
*B60K 17/00* (2006.01)
*B60K 17/346* (2006.01)
(Continued)

(52) U.S. Cl.
CPC ......... *B60K 17/3467* (2013.01); *B60K 17/346* (2013.01); *B60K 23/08* (2013.01);
(Continued)

(58) Field of Classification Search
CPC ....................... B60K 17/3462; B60K 17/3467
See application file for complete search history.

(56) References Cited

U.S. PATENT DOCUMENTS

| 2,783,661 A | 3/1957 | Dryer |
| 4,407,387 A | 10/1983 | Lindbert |

(Continued)

FOREIGN PATENT DOCUMENTS

| KR | 201999002080 | 6/1999 |
| KR | 100274035 B1 | 12/2000 |

(Continued)

OTHER PUBLICATIONS

International Search Report and Written Opinion for International Application No. PCT/US2009/053514, dated Mar. 29, 2010.

(Continued)

*Primary Examiner* — Tisha Lewis
(74) *Attorney, Agent, or Firm* — Harness, Dickey & Pierce, P.L.C.

(57) ABSTRACT

A vehicle driveline that includes a differential assembly, a two-speed transmission, a power take-off unit, a range sleeve, a mode sleeve and an input shaft. The range sleeve is non-rotatably but axially slidably coupled to the input shaft. The range sleeve provides rotary power to the two-speed transmission and is movable into different positions to control the gear ratio in which the two-speed transmission operates. The two-speed transmission outputs rotary power to the differential assembly. The mode sleeve is selectively movable into a position where it transmits rotary power between the range sleeve and a PTU input of the power-take off unit. Movement of the range and mode sleeves can be coordinated to provide a two-wheel drive high speed mode, a four-wheel drive high speed mode and a four-wheel drive low speed mode.

20 Claims, 18 Drawing Sheets

Related U.S. Application Data continuation of application No. 13/470,941, filed on May 14, 2012, now Pat. No. 8,795,126.

(51) Int. Cl.
*F16H 48/22* (2006.01)
*F16H 37/08* (2006.01)
*B60K 17/02* (2006.01)
*B60K 23/08* (2006.01)

(52) U.S. Cl.
CPC ........... *F16H 37/082* (2013.01); *F16H 48/22* (2013.01); *B60K 17/02* (2013.01); *B60K 23/0808* (2013.01); *Y10T 74/19019* (2015.01)

(56) References Cited

U.S. PATENT DOCUMENTS

| | | | |
|---|---|---|---|
| 4,774,857 A | 10/1988 | Heine et al. | |
| 4,915,190 A | 4/1990 | Iwata | |
| 5,098,352 A | 3/1992 | Montanaro et al. | |
| 5,105,901 A | 4/1992 | Watanabe et al. | |
| 5,105,902 A | 4/1992 | Wilson et al. | |
| 5,411,110 A | 5/1995 | Wilson et al. | |
| 5,562,566 A | 10/1996 | Yang | |
| 5,599,249 A | 2/1997 | Zalewski et al. | |
| 5,916,051 A * | 6/1999 | Schleuder | B60K 17/344 |
| | | | 475/138 |
| 5,951,428 A | 9/1999 | Itoh et al. | |
| 6,113,512 A | 9/2000 | Williams | |
| 6,186,258 B1 | 2/2001 | Deutschel et al. | |
| 6,263,995 B1 | 7/2001 | Watson et al. | |
| 6,575,867 B1 * | 6/2003 | Stephens | B60K 17/3467 |
| | | | 180/248 |
| 6,805,653 B2 | 10/2004 | Krzesicki et al. | |
| 6,814,682 B2 | 11/2004 | Spitale | |
| 6,851,501 B2 | 2/2005 | Gassmann | |
| 6,974,400 B2 | 12/2005 | Williams | |
| 7,150,694 B2 | 12/2006 | Mizon et al. | |
| 7,331,896 B1 | 2/2008 | Kroppe | |
| 7,416,505 B2 | 8/2008 | Downs | |
| 7,533,754 B2 | 5/2009 | Burrows et al. | |
| 8,042,642 B2 | 10/2011 | Marsh et al. | |
| 8,047,323 B2 | 11/2011 | Downs et al. | |
| 8,172,712 B2 | 5/2012 | Jarzyna et al. | |
| 2002/0042318 A1 * | 4/2002 | Brown | B60K 17/3467 |
| | | | 475/204 |
| 2002/0088291 A1 | 7/2002 | Bowen | |
| 2004/0220010 A1 * | 11/2004 | Williams | B60K 17/3462 |
| | | | 475/198 |
| 2005/0023063 A1 | 2/2005 | Mueller | |
| 2006/0283654 A1 | 12/2006 | Krisher | |
| 2008/0227582 A1 | 9/2008 | Peura | |
| 2008/0230295 A1 | 9/2008 | Grogg | |
| 2009/0229905 A1 | 9/2009 | Kato et al. | |
| 2010/0216593 A1 | 8/2010 | Ekonen et al. | |
| 2011/0039652 A1 | 2/2011 | Ekonen et al. | |
| 2011/0275470 A1 | 11/2011 | Ekonen et al. | |
| 2011/0319213 A1 | 12/2011 | Ekonen et al. | |
| 2012/0029779 A1 | 2/2012 | Dickinson et al. | |
| 2012/0073929 A1 | 3/2012 | Grutter et al. | |
| 2012/0083380 A1 | 4/2012 | Reed et al. | |
| 2012/0234120 A1 | 9/2012 | Fukuda et al. | |

FOREIGN PATENT DOCUMENTS

| | | |
|---|---|---|
| KR | 100291087 B1 | 3/2001 |
| KR | 100483163 B1 | 4/2005 |
| WO | WO-2010104853 A2 | 9/2010 |

OTHER PUBLICATIONS

International Preliminary Report on Patentability (Chapter I of the Patent Cooperation Treaty) for PCT/US2009/053514, issued Feb. 15, 2011.

International Search Report and Written Opinion for International Application No. PCT/US2010/041767, dated Feb. 28, 2011.

\* cited by examiner

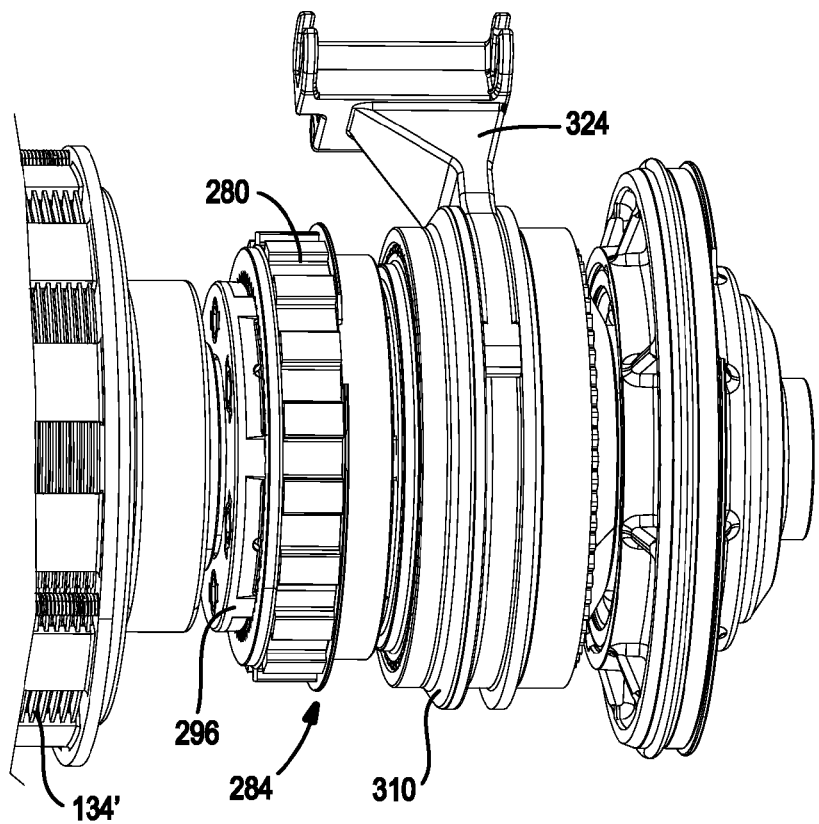
FIG. 20
FIG. 21
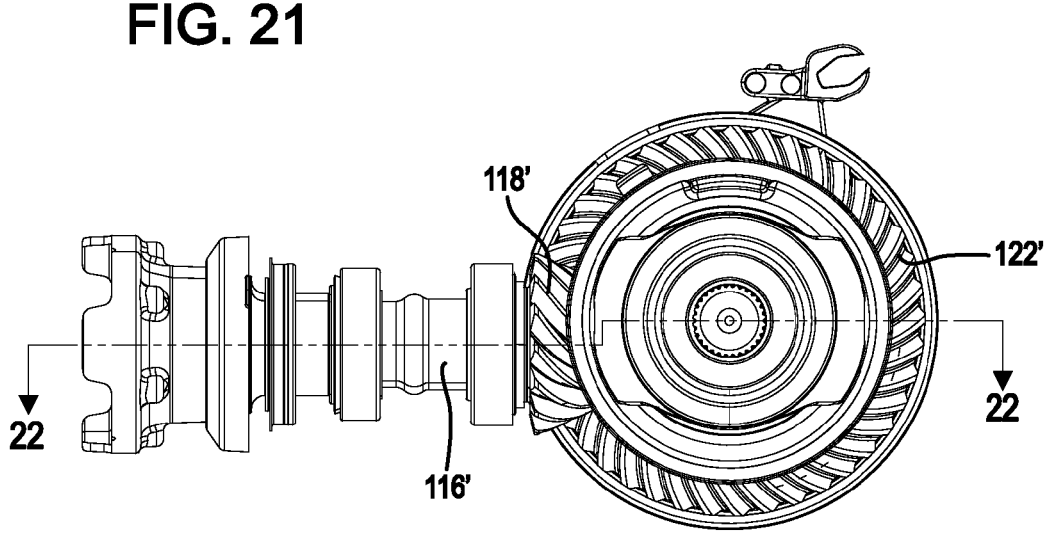

DISCONNECTABLE DRIVELINE FOR ALL-WHEEL DRIVE VEHICLE

CROSS-REFERENCE TO RELATED APPLICATIONS

This application is a continuation of U.S. patent application Ser. No. 14/244,158 filed Apr. 3, 2014, which is a continuation of U.S. patent application Ser. No. 13/470,941 filed May 14, 2012 (now U.S. Pat. No. 8,795,126 issued Aug. 5, 2014). The disclosure of each of the above-referenced patent applications is incorporated by reference as if fully set forth in detail herein.

FIELD

The present disclosure relates generally to all-wheel drive vehicles and more particularly to single-speed and multi-speed disconnectable drivelines for all-wheel drive vehicles.

BACKGROUND

This section provides background information related to the present disclosure which is not necessarily prior art.

Many modern automotive vehicles, such as crossover vehicles, are available with an all-wheel drive (AWD) drivetrain that is based on a front-wheel drive (FWD) architecture. This optional drivetrain arrangement permits drive torque to be selectively and/or automatically transferred from the powertrain to both the primary (i.e., front) driveline and the secondary (i.e., rear) driveline to provide better traction when the vehicle is operated in inclement weather and on off-highway road conditions. Such AWD vehicles necessarily are equipped with a much more complex drivetrain which, in addition to the primary driveline, must include the additional components associated with the secondary driveline such as a power take-off unit and a propshaft.

In an effort to minimize driveline losses (i.e., viscous drag, friction, inertia and oil churning) associated with secondary driveline being back-driven when no drive torque is transmitted thereto, it is known to incorporate a disconnect system that is configured to uncouple components of the secondary driveline such as, for example, the rear wheels or the rear differential from the remainder of the secondary driveline. To this end, there remains a need in the art for development of improved disconnectable drivelines for use in AWD vehicles.

SUMMARY

It is an aspect of the present teachings to provide a disconnectable secondary driveline arrangement for use with all-wheel drive vehicles that includes a single-speed power take-off unit having a disconnect mechanism, a single-speed rear drive module having a torque transfer device capable of providing a disconnect function, a speed synchronizing function and a torque biasing function, and a control system for controlling actuation of the disconnect mechanism and the torque transfer device.

It is another aspect of the present teachings to provide a disconnectable secondary driveline arrangement for use with all-wheel drive vehicles that includes a two-speed power take-off unit having a disconnect mechanism and range shift mechanism, a two-speed rear drive module having a torque transfer device and a range shift mechanism, and a control system for controlling coordinated actuation of the two-speed power take-off unit and the two-speed rear drive module.

In accordance with these and other aspects of the present teachings, an all-wheel drive vehicle can include a powertrain, a primary driveline, a power switching mechanism, a secondary driveline, and a control system. The powertrain can include a prime mover and a transmission having an output. The primary driveline is driven by the transmission output and is operable to direct rotary power from the prime mover to a pair of primary vehicle wheels. The power switching mechanism is operable under the control of the control system in one of a disconnected mode and a connected mode. The power switching mechanism is operable in its connected mode to direct rotary power from the transmission output to the secondary driveline. The secondary driveline can include a rear drive module and a propshaft that couples an output of the power switching mechanism to an input of the rear drive module. The rear drive module can include a secondary differential interconnecting a pair of axleshafts to a pair of secondary vehicle wheels, and a torque transfer device operably disposed between the input and the secondary differential. The torque transfer device is operable under the control of the control system in one of a disconnected mode and a connected mode. The torque transfer device is operable in its connected mode to direct rotary power transmitted by the power switching mechanism to the secondary differential. When the power switching mechanism and the torque transfer device are in their disconnected modes, rotary power is only transmitted to the primary vehicle wheels. The torque transfer device is operable in its disconnected mode to prevent the secondary vehicle wheels and the secondary differential from back-driving the input of the rear drive module, the propshaft, and the output of the power switching mechanism. The power switching mechanism is operable in its disconnected mode to prevent the transmission output from driving the output of the power switching mechanism and the propshaft.

In addition to the above, an all-wheel drive vehicle of the present teachings can also include a two-speed power switching mechanism and a two-speed rear drive module. The two-speed power switching mechanism is still operable in its disconnected and connected modes but further includes a planetary reduction mechanism and a range shift mechanism that are operably disposed between the transmission output and a primary differential that drives the primary vehicle wheels. The power switching mechanism is capable of establishing a two-wheel high-range drive connection, a four-wheel high-range drive connection, and a four-wheel low-range drive connection between the transmission output and the primary differential. The two-speed rear drive module is still operable in its disconnected and connected modes but further includes a planetary reduction mechanism and a range shift mechanism that are operably disposed between an output of the torque transfer device and the secondary differential. The rear drive module is capable of establishing a high range drive connection and a low-range drive connection between the output of the torque transfer device and an input to the secondary differential. The control system is operable to coordinate actuation of the two-speed power switching mechanism and the two-speed rear drive module.

In still another form, the present teachings provide a rear drive module for a drivetrain of an all-wheel drive motor vehicle. The rear drive module includes an axle housing, an input pinion rotatably coupled to the axle housing, a spool rotatably coupled to the axle housing, a ring gear, a disconnect clutch, a differential assembly and a pair of axle shafts.

The ring gear is coupled to the spool for rotation therewith and is meshingly engaged with the input pinion. The disconnect clutch has a first clutch member, which is coupled to the spool for rotation therewith, and a second clutch member. The disconnect clutch being configured to selectively transmit rotary power between the first and second clutch members. The differential assembly has a differential case and a differential gearset with a pair of differential outputs. The differential gearset is configured to receive rotary power from the differential case and to output rotary power to the differential outputs. The hollow shaft is received in the spool and is coupled to the differential case for rotation therewith. The hollow shaft is configured to transmit rotary power in a power path between the disconnect clutch and the differential assembly. Each axle shaft is coupled to a corresponding one of the differential outputs for rotation therewith.

In yet another form, the present disclosure provides a vehicle driveline that includes an input shaft, which is rotatable about a first axis, a range sleeve, a mode sleeve, a differential assembly, a two-speed transmission and a power take-off unit. The range sleeve is concentric with the input shaft and is non-rotatably but axially slidably coupled to the input shaft. The mode sleeve is concentric with the input shaft. The differential assembly has a differential case, which is rotatable about the first axis, and a differential gearset. The two-speed transmission receives rotary power from the range sleeve and outputs rotary power to the differential case. The power take-off unit has a PTU input and a PTU output that is disposed along a second axis that is not parallel to the first axis. The two-speed transmission operates in a first speed ratio when the range sleeve is positioned in a first range sleeve position and in a second speed ratio when the range sleeve is positioned in a second range sleeve position. The mode sleeve is movable between a first mode sleeve position, in which the mode sleeve is disengaged from at least one of the PTU input member and the range sleeve, and a second mode sleeve position in which the mode sleeve is located in a position where it is capable of transmitting rotary power between the range sleeve and the PTU input member. Movement of the range sleeve and the mode sleeve is coordinated to provide a two-wheel drive high range operational mode, a four-wheel drive high range operational mode and a four-wheel drive low range operational mode.

In still another form, the present disclosure provides a vehicle driveline that includes an input shaft, which is rotatable about a first axis, a range sleeve, a mode sleeve, a planetary transmission, a differential assembly, an axle shaft and a power transfer unit. The range sleeve is concentric with the input shaft and is non-rotatably but slidably coupled to the input shaft so as to be movable along the first axis between a first range sleeve position and a second range sleeve position. The mode sleeve is concentric with the input shaft and is slidable along the first axis between a first mode sleeve position and a second mode sleeve position. The planetary transmission has a planet carrier, a sun gear and a plurality of planet gears that are rotatably mounted on the planet carrier and meshingly engaged to the sun gear. The differential assembly has a differential case and a differential gearset. The differential case is coupled to the planet carrier for common rotation about the first axis. The differential gearset is disposed in the differential case and includes a pair of differential output members. The axle shaft is coupled for rotation with one of the differential output members and extends through the sun gear and the input shaft. The power transfer unit has a PTU input and a PTU output that is rotatable about a second axis that is transverse to the first axis. Placement of the range sleeve in the first range sleeve position couples the planet carrier to the input shaft for common rotation. Placement of the range sleeve in the second range sleeve position couples the sun gear to the input shaft for common rotation. Placement of the mode sleeve in the first mode sleeve position when the range sleeve is in the first range sleeve position de-couples the range sleeve from the PTU input to permit relative rotation between the range sleeve and the PTU input. Placement of the mode sleeve in the second mode sleeve position when the range sleeve is in the first range sleeve position couples the range sleeve to the PTU input for common rotation.

Further areas of applicability will become apparent from the description and claims herein. The description and specific examples in this summary are intended for purposes of illustration only and are not intended to limit the scope of the present disclosure.

DRAWINGS

The drawings described herein are for illustrative purposes only of selected embodiments and are not intended to limit the scope of the present disclosure in any way. Similar or identical elements are given consistent reference numerals throughout the various figures.

The present disclosure will become more fully understood from the detailed description and the accompanying drawings wherein:

FIGS. 18 through 21 are perspective views of a two-speed rear drive module based on the schematics shown in FIGS. 17a through 17d, with and without its housing structure, and which is constructed in accordance with the present teachings;

DETAILED DESCRIPTION

The following exemplary embodiments are provided so that the present disclosure will be thorough and fully convey the scope to those skilled in the art. Numerous specific details are set forth such as examples of specific components, devices and schematic configurations to provide a thorough understanding of exemplary embodiments of the present disclosure. However, it will be apparent to those skilled in the art that these specific details need not be employed, that the exemplary embodiments may be embodied in many different forms, and that neither should be construed to limit the scope of the present disclosure.

Figure 1:
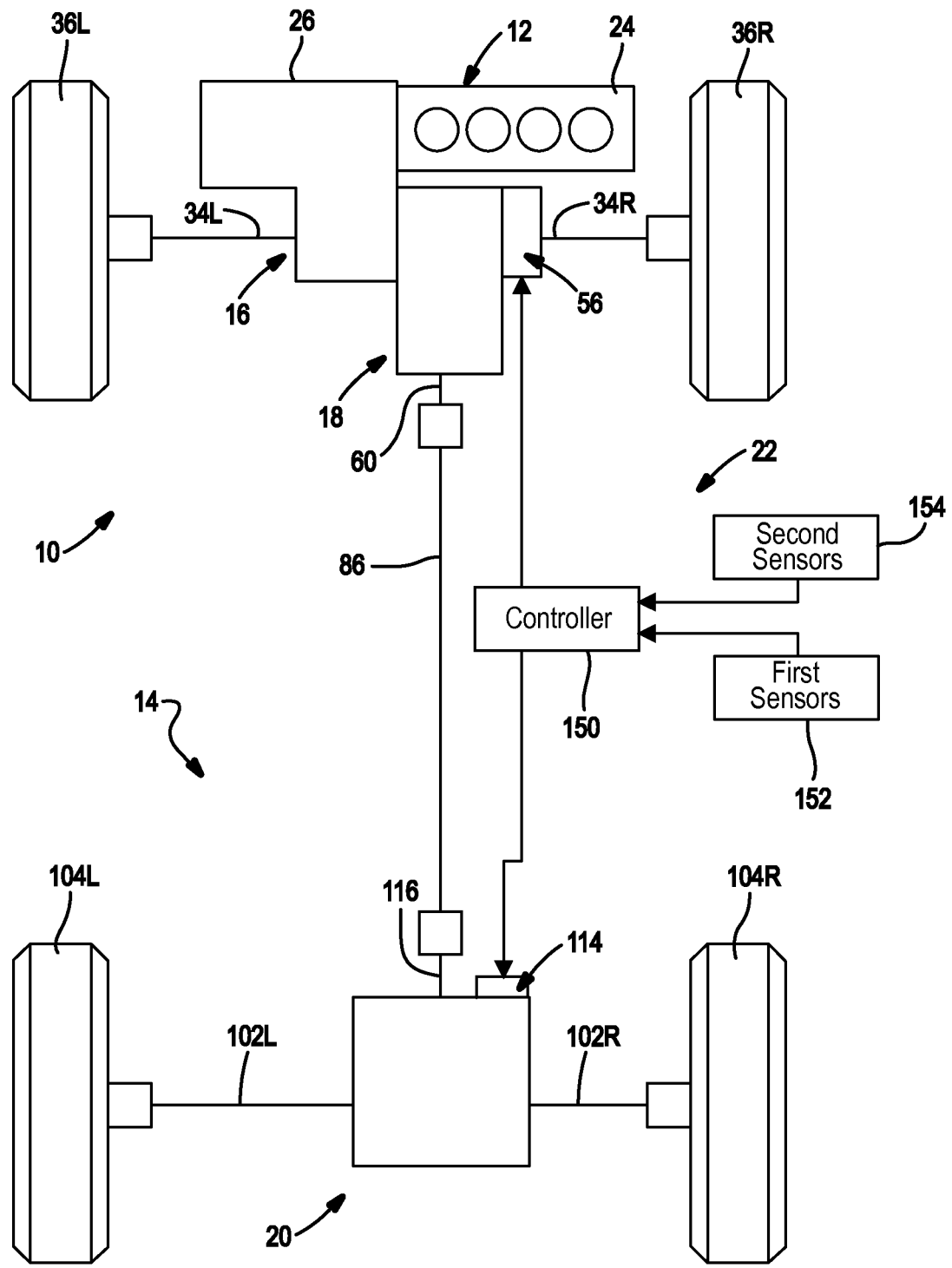
FIG. 1 is a schematic of a motor vehicle equipped with a disconnectable all-wheel drive system constructed in accordance with the present teachings.

With reference to FIG. 1 of the drawings, a motor vehicle constructed in accordance with the teachings of the present disclosure is schematically shown and generally indicated by reference numeral 10. The vehicle 10 can include a powertrain 12 and a drivetrain 14 that can include a primary driveline 16, a power switching mechanism 18, a secondary driveline 20, and a control system 22. In the various aspects of the present teachings, the primary driveline 16 can be a front driveline while the secondary driveline 20 can be a rear driveline.

The powertrain 12 can include a prime mover 24, such as an internal combustion engine or an electric motor, and a transmission 26 which can be any type of ratio-changing mechanism, such as a manual, automatic, or continuously variable transmission. The prime mover 24 is operable to provide rotary power to the primary driveline 16 and the power transfer mechanism 18.

Figure 2:
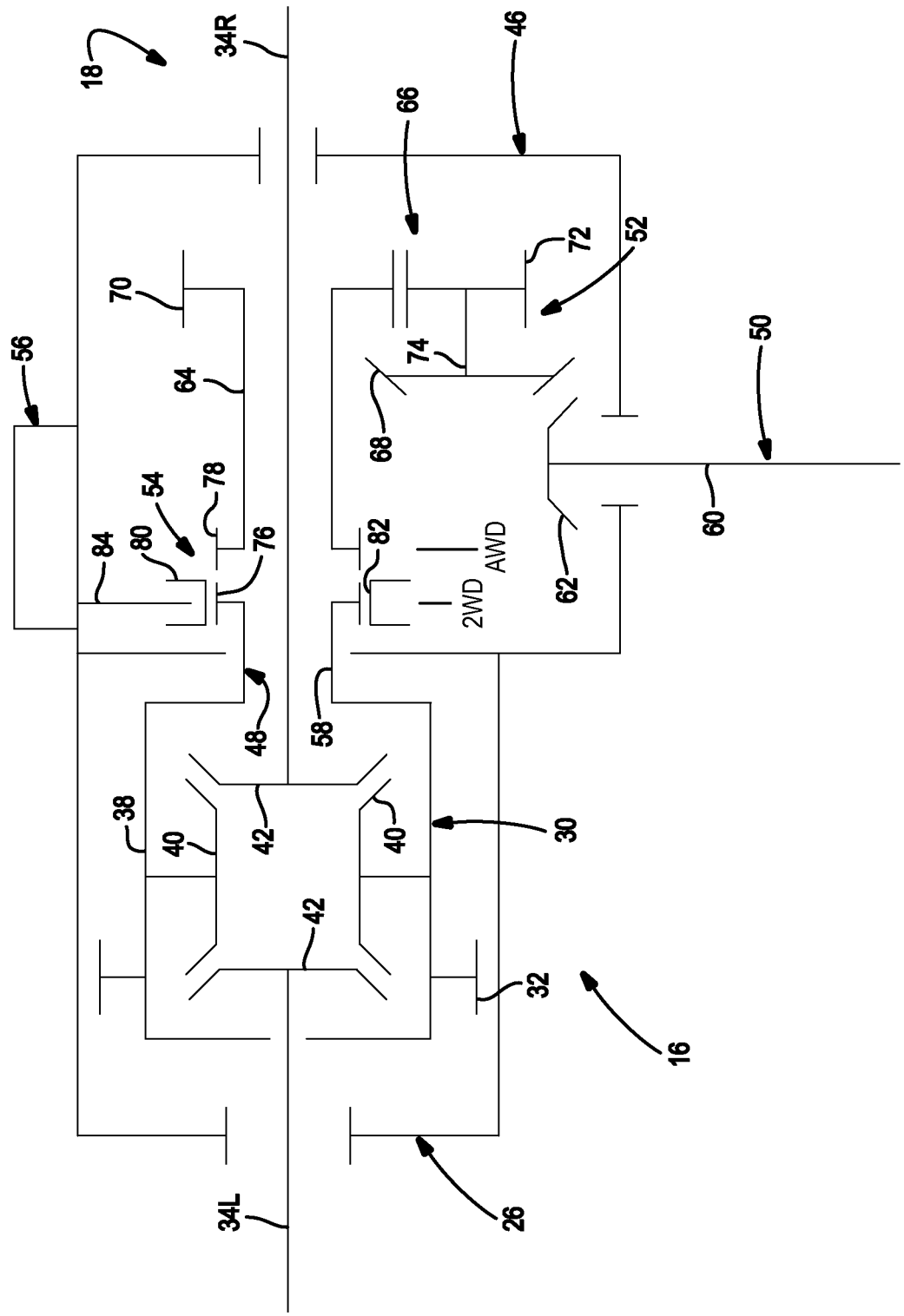
FIG. 2 is a schematic illustration of a single-speed power take-off unit associated with the disconnectable all-wheel drive system of FIG. 1.
Figure 3:
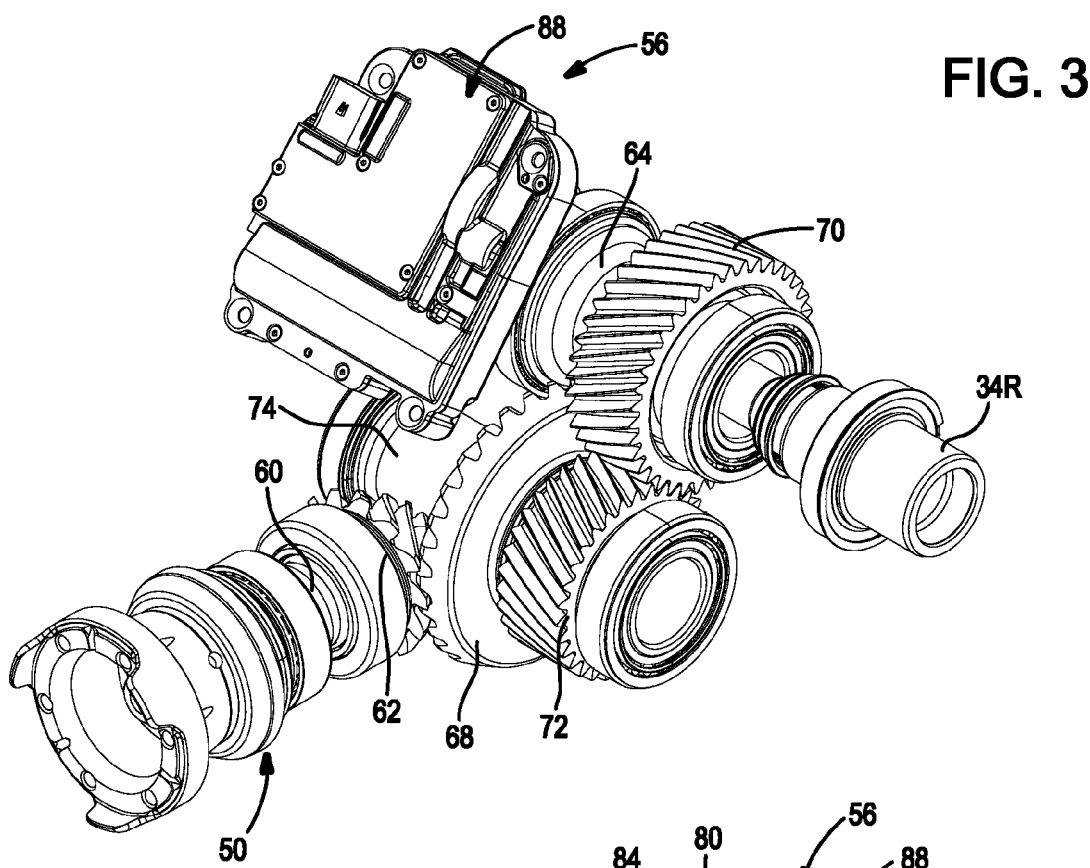
FIG. 3 through FIG. 5 are perspective views of a single-speed power take-off unit based on the schematic shown in FIG. 2 with its housing structure removed for improved clarity and which is constructed in accordance with the present teachings.
Figure 4:
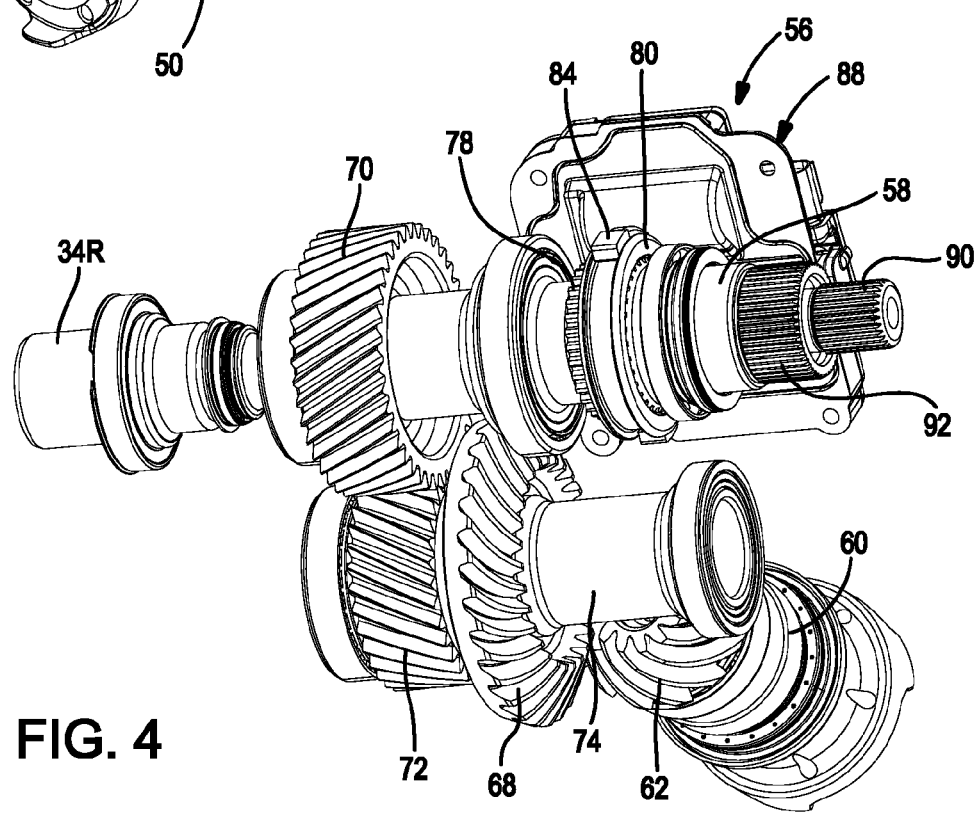
Figure 5:
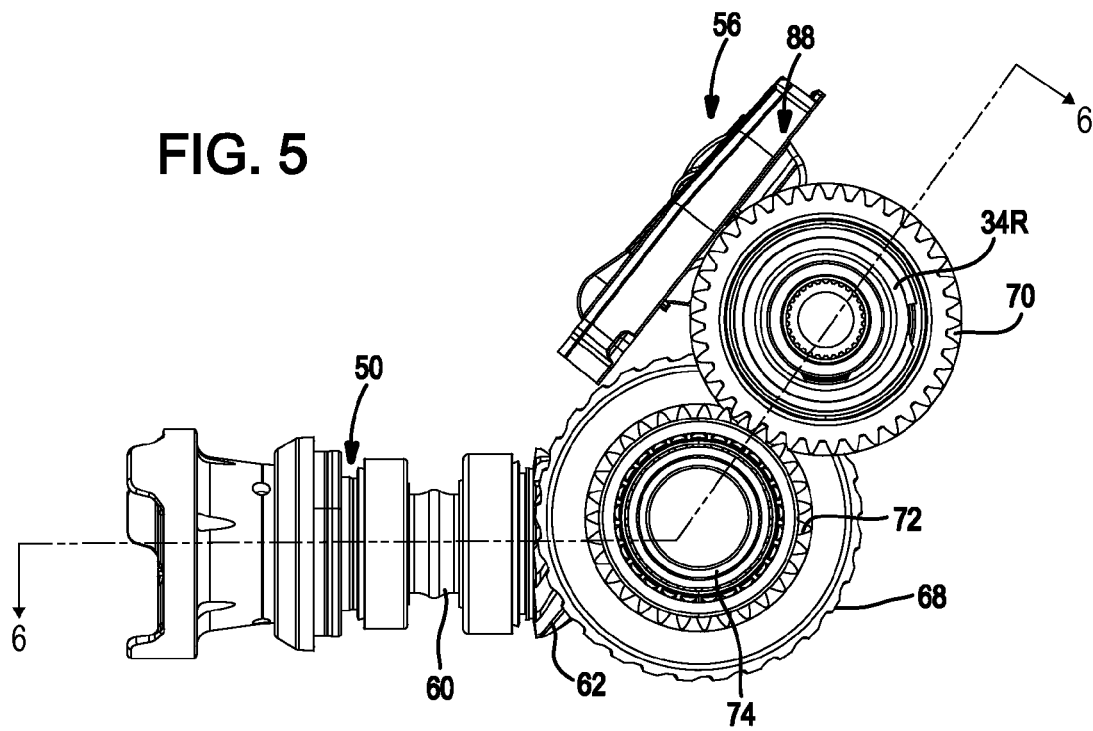
Figure 6:
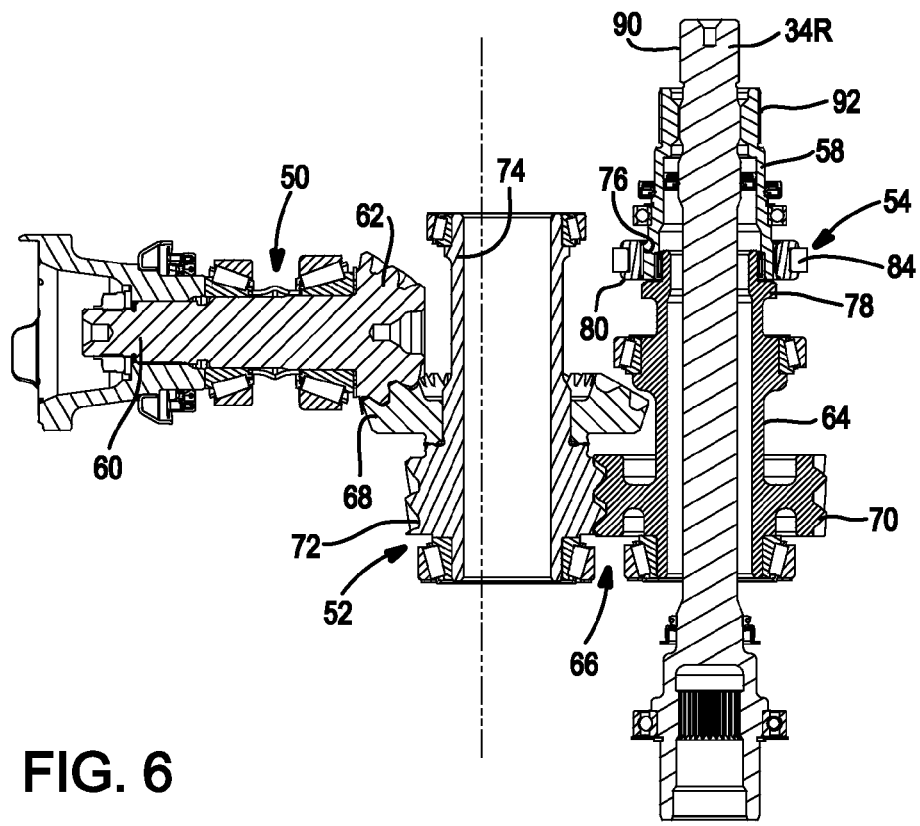
FIG. 6 is a sectional view of the single-speed power take-off unit taken generally along line 6-6 of FIG. 5.

With additional reference to FIG. 2, the primary driveline 16 can include a primary or first differential 30 having an input member 32 driven by an output member (not shown) of the transmission 26. In the particular construction shown, the first differential 30 is configured as part of the transmission 26, a type commonly referred to as a transaxle and typically used in front-wheel drive vehicles. The primary driveline 16 can further include a pair of first axleshafts 34L, 34R that can couple output components of the first differential 30 to a set of first vehicle wheels 36L, 36R. The first differential 30 can include a first differential case 38 that is rotatably driven by the input member 32, at least one pair of first pinion gears 40 rotatably driven by the first differential case 38, and a pair of first side gears 42 meshed with the first pinion gears 40 and which are connected to drive the first axleshafts 34L, 34R.

With continued reference to FIG. 2, the power switching mechanism 18, hereinafter referred to as a power take-off unit (PTU), can generally include a housing 46, an input 48 coupled for common rotation with the first differential case 38 of the first differential 30, an output 50, a transfer gear assembly 52, a disconnect mechanism 54, and a disconnect actuator 56. The input 48 can include a tubular input shaft 58 rotatably supported by the housing 46 and which concentrically surrounds a portion of the first axleshaft 34R. A first end of the input shaft 58 can be coupled for rotation with the first differential case 38. The output 50 can include an output pinion shaft 60 rotatably supported by the housing 46 and having a pinion gear 62. The transfer gear assembly 52 can include a hollow transfer shaft 64, a helical gearset 66, and a hypoid gear 68 that is meshed with the pinion gear 62. The transfer shaft 64 concentrically surrounds a portion of the first axleshaft 34R and is rotatably supported by the housing 46. The helical gearset 66 can include a first helical gear 70 fixed for rotation with the transfer shaft 64 and a second helical gear 72 which is meshed with the first helical gear 70. The second helical gear 72 and the hypoid gear 68 are integrally formed on, or fixed for common rotation with, a stub shaft 74 that is rotatably supported in the housing 46.

The disconnect mechanism 54 can comprise any type of clutch, disconnect or coupling device that can be employed to selectively transmit rotary power from the powertrain 14 to the secondary driveline 20. In the particular example provided, the disconnect mechanism 54 is configured as a dog clutch. The dog clutch can include a set of external spline teeth 76 formed on a second end of the input shaft 58, a set of external clutch teeth 78 formed on the transfer shaft 64, a mode collar 80 having internal spline teeth 82 constantly meshed with the external spline teeth 76 on the input shaft 58, and a shift fork 84 operable to axially translate the shift collar 80 between a first mode position and a second mode position. While schematically shown as a non-synchronized dog clutch, it will be understood that the disconnect mechanism 54 can include a synchronized dog clutch if such a configuration is desired.

The mode collar 80 is shown in its first mode position, identified by a "2WD" leadline, wherein the internal spline teeth 82 on the mode collar 80 are disengaged from the external clutch teeth 78 on the transfer shaft 64. As such, the input shaft 58 is disconnected from driven engagement with the transfer shaft 64. Thus, no rotary power is transmitted from the powertrain 12 to the transfer gear assembly 52 and the output pinion shaft 60 of the power take-off unit 18. With the mode collar 80 in its second mode position, identified by an "AWD" leadline, its internal spline teeth 82 are engaged with both the external spline teeth 76 on the input shaft 58 and the external clutch teeth 78 on the transfer shaft 64. Accordingly, the mode collar 80 establishes a drive connection between the input shaft 58 and the transfer shaft 64 such that rotary power from the powertrain 12 is transmitted through the power take-off unit 18 to the output pinion shaft 60. As will be detailed, the output pinion shaft 60 is coupled via a propshaft 86 to the secondary driveline 20.

The disconnect actuator 56 can be any type of actuator mechanism that is operable for axially moving the shift fork 84 which, in turn, causes concurrent axial translation of the mode collar 80 between its two distinct mode positions. The disconnect actuator 56 is shown mounted to the housing 46 of the power take-off unit 18. The disconnect actuator 56 can be a power-operated mechanism that can receive control signals from the control system 22 and can include, for example, hydraulically-actuated, pneumatically-actuated or electromechanically-actuated arrangements.

As noted, FIG. 2 schematically illustrates the components that can be associated with the power take-off unit 18. Reference now to FIG. 3 through 6 will provide a more definitive structural configuration of such components that are associated with an exemplary embodiment of the power take-off unit 18. In particular, these figures illustrate the components in an assembled condition with the housing 46 removed for improved clarity. Each of the input shaft 58, the transfer shaft 64, the stub shaft 74, and the output pinion shaft 60 are shown with suitable bearings assembled thereon for rotatably supporting each within or from the housing 46. The disconnect actuator 56 is shown as a self-contained power-operated unit 88 from which the shift fork 84 extends. The power-operated unit 88 can include an electric motor and a geared drive unit configured to convert rotation of the motor output into translational movement of the shift fork 84. External spline teeth 90 are provided on one end of the first axleshaft 34R for facilitating a splined connection with its respective first side gear 42 in the first differential 30. Likewise, external spline teeth 92 are provided on the first end of the input shaft 58 for facilitating a splined connection with a mating portion of the first differential case 38.

Figure 7:
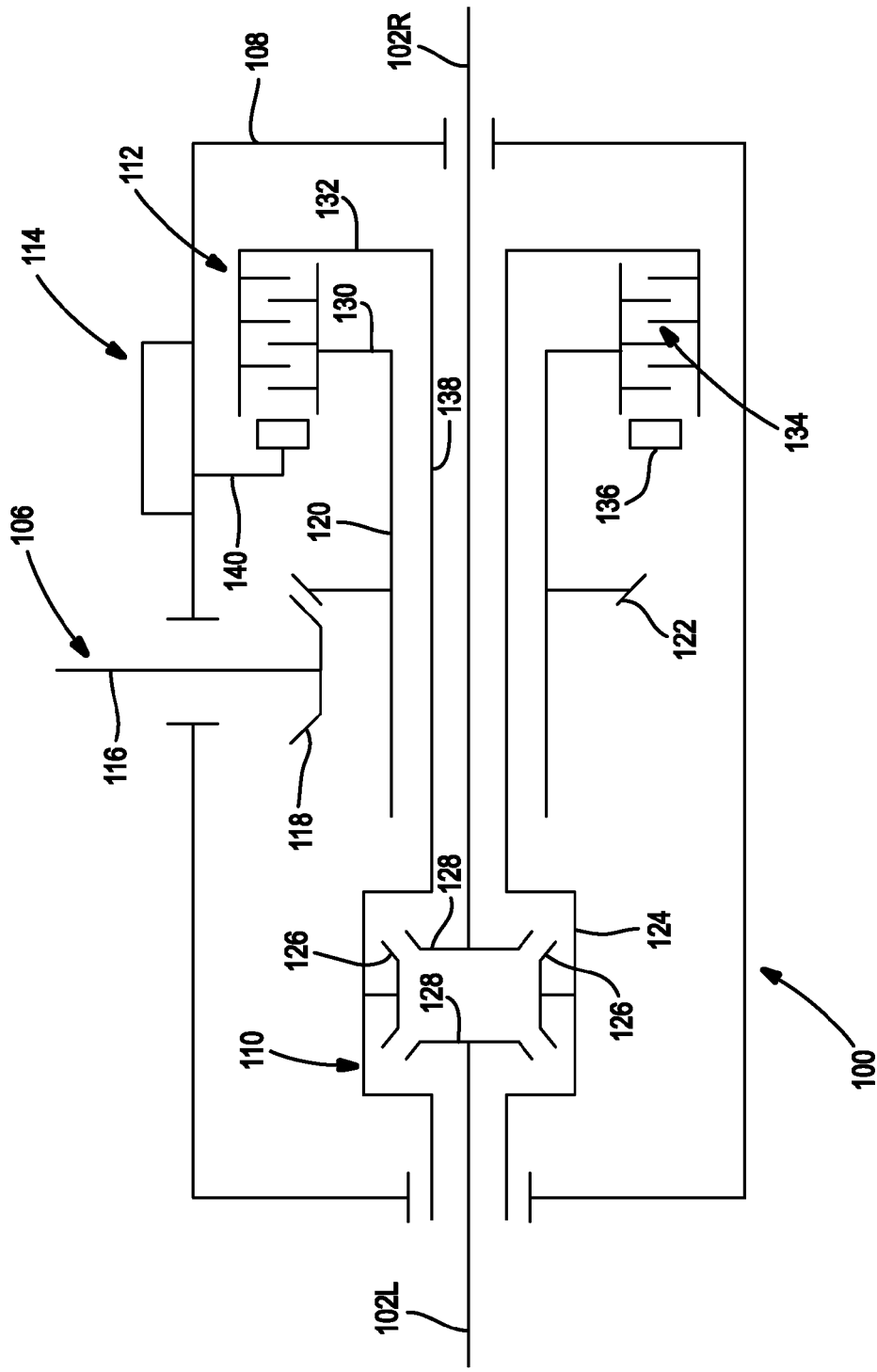
FIG. 7 is a schematic illustration of a single-speed rear drive module associated with the disconnectable all-wheel drive system of FIG. 1.
Figure 8:
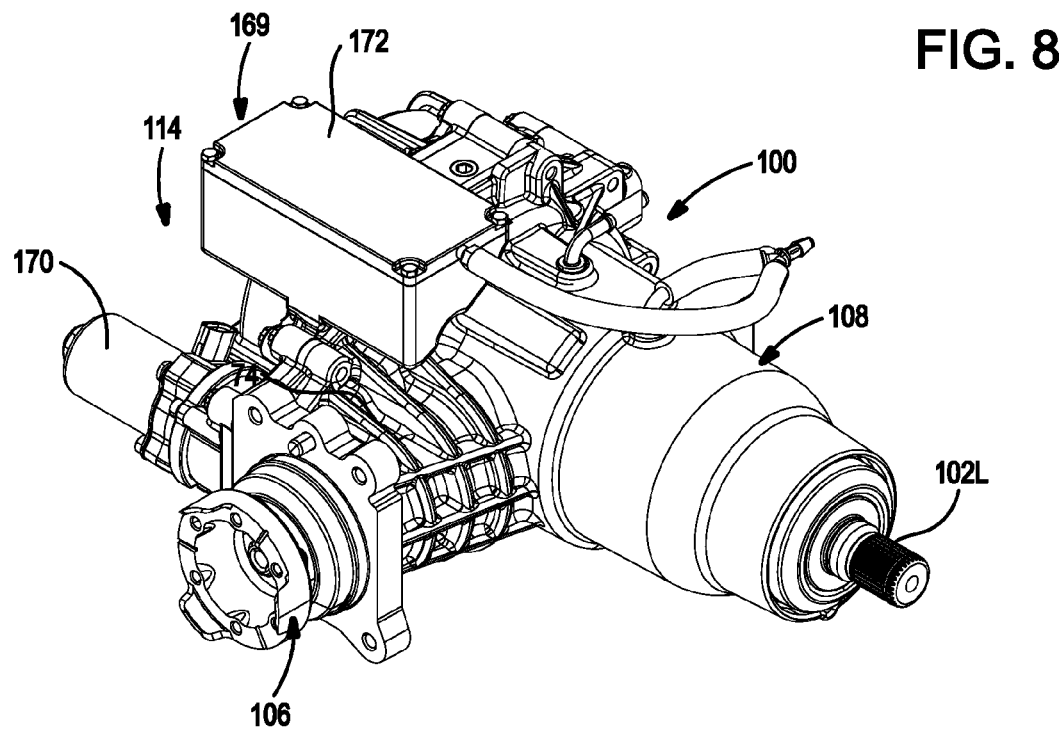
FIGS. 8 through 10 are perspective views of a single-speed rear drive module based on the schematic shown in FIG. 7, with and without its housing structure, and which is constructed in accordance with the present teachings.
Figure 9:
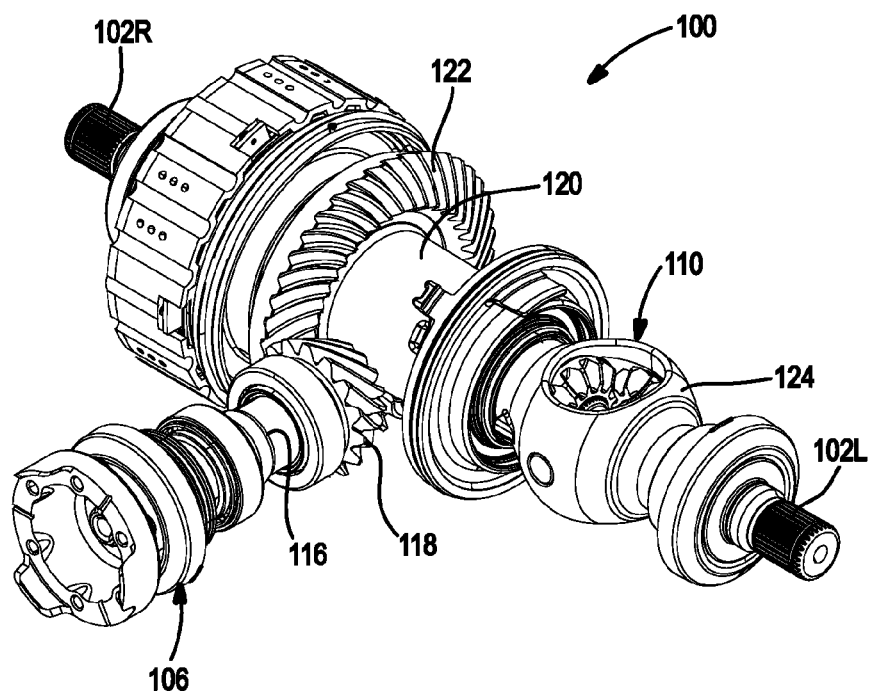
Figure 10:
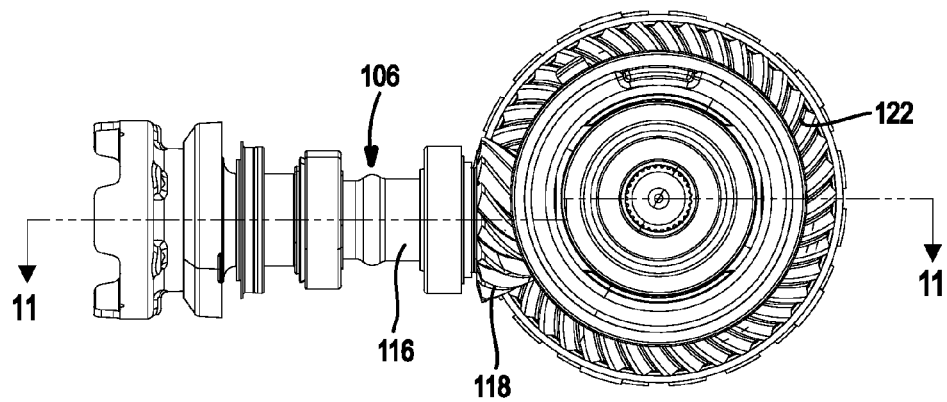
Figure 11:
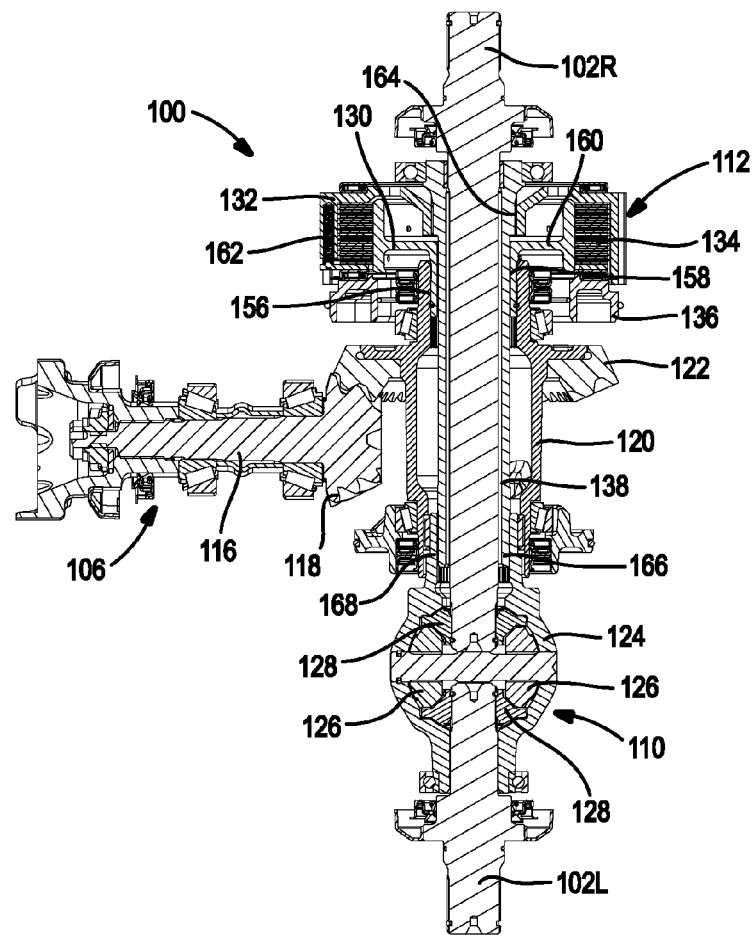
FIG. 11 is a sectional view of the single-speed rear drive module taken generally along line 11-11 of FIG. 10.

With particular reference now to FIGS. 1 and 7, the secondary driveline 20 can include the propshaft 86, a rear drive module (RDM) 100, a pair of second axleshafts 102L, 102R, and a set of second vehicle wheels 104L, 104R. A first end of the propshaft 86 can be coupled for rotation with the output pinion shaft 60 extending from the power take-off unit 18 while a second end of the propshaft 86 can be coupled for rotation with an input 106 of the rear drive module 100. The rear drive module 100 can include a housing 108, a secondary or second differential 110, a torque transfer device (TTD) 112 that is generally configured and arranged to selectively couple and transmit rotary power from the input 106 to the second differential 110, and a TTD actuator 114. The input 106 can include an input pinion shaft 116 having a pinion gear 118, a hollow spool 120, and a hypoid gear 122 fixed for rotation with the spool 120 and which is meshed with the pinion gear 118. The second differential 110 can include a second differential case 124, at least one pair of second pinion gears 126 rotatably driven by the second differential case 124, and a pair of second output side gears 128 that are meshed with the second pinion gears 126. The second output side gears 128 are fixed for rotation with the inboard ends of the second axleshafts 102L, 102R.

The torque transfer device 112 can include any type of clutch or coupling device that can be employed to selectively transmit rotary power from the input 106 to the second differential 110. In the example shown, the torque transfer device 112 is a multi-plate friction clutch that can include an input clutch member 130 driven by the spool 120, an output clutch member 132 coupled for rotation with the second differential case 124, a multi-plate clutch pack 134 having interleaved friction plates disposed between the input and output clutch members, and an engagement member 136 that is moveable for selectively applying a clutch engagement force to the clutch pack 134. An elongated hollow clutch output shaft 138 can connect the output clutch member 132 for common rotation with the second differential case 124 and is configured to surround a portion of the second axleshaft 102R. The TTD actuator 114 is provided to generate translational movement of the engagement member 136 relative to the clutch pack 134 and can be controlled by control signals from the control system 22.

A first or "disconnected" mode can be established for the torque transfer device 112 when the engagement member 136 is positioned such that rotary power is not transmitted from the input clutch member 130 to the output clutch member 132. In this "disconnected" mode, the second vehicle wheels 104L, 104R, the second axleshafts 102L, 102R, the second differential 110, the clutch output shaft 138 and the output clutch member 132 are disconnected from the input 106 of the rear drive module 100. As such, rotation of these components as a result of rolling motion of the second vehicle wheels does not "back-drive" the propshaft 86 and components of the power take-off unit 18.

A second or "connected" mode for the torque transfer device 112 can be established when the clutch engagement force exerted by the engagement member 136 on the clutch pack 134 causes rotary power to be transmitted from the input 106 to the clutch output shaft 138 for delivery to the rear wheels 104L, 104R through the second differential 110. In addition, a "torque biasing" function can also be provided in the connected mode since variable control over the magnitude of the clutch engagement force applied to the clutch pack 134 can vary the distribution ratio of the rotary power transmitted from the powertrain 12 to the primary driveline 16 and the secondary driveline 20. Thus, the torque transfer device 112 can be configured or controlled to slip or cyclically engage and disengage as appropriate for biasing the available drive torque while establishing the drive connection between the input 106 and the second differential 110.

The TTD actuator 114 can be any power-operated device capable of shifting the torque transfer device 112 between its first and second modes as well as adaptively regulating the magnitude of the clutch engagement force exerted by the engagement member 136 on the clutch pack 134. Thus, the TTD actuator 114 can, for example, include an electromagnetic or motor-driven ballscrew, ballramp or other cam actuation system having a mechanical connection, shown by lead line 140, with the engagement member 136. Alternatively, the TTD actuator 114 can include a hydraulic actuation system capable of regulating the position of the engagement member 136 relative to the clutch pack 134 by regulating fluid pressure, also indicated by lead line 140, delivered to a pressure chamber.

The control system 22 is schematically shown in FIG. 1 to include a controller 150, a group of first sensors 152, and a group of second sensors 154. The group of first sensors 152 can be arranged within the motor vehicle 10 to sense a vehicle parameter and responsively generate a first sensor signal. The vehicle parameter can be associated with any combination of the following: vehicle speed, yaw rate, steering angle, engine torque, wheel speeds, shaft speeds, lateral acceleration, longitudinal acceleration, throttle position and gear position without limitations thereto. The group of second sensors 154 can be configured to sense a driver-initiated input to one or more on-board devices and/or systems within the vehicle 10 and responsively generate a second sensor signal. For example, the motor vehicle 10 may be equipped with a sensor associated with a mode selection device, such as a switch associated with a push button or a lever, that senses when the vehicle operator has selected between vehicle operation in a two-wheel drive (FWD) mode and an all-wheel drive (AWD) mode. Also, switched actuation of vehicular systems such as the windshield wipers, the defroster, and/or the heating system, for example, may be used by the controller 150 to assess whether the motor vehicle 10 should be shifted automatically between the FWD and AWD modes.

As noted, FIG. 7 schematically illustrates the components that can be associated with the rear drive module 100. Referring now to FIGS. 8 through 11, a more definitive structural configuration of such components associated with an exemplary embodiment of the rear drive module 100 is shown. These views illustrate the components in an assembled condition, with and without the housing 108. Each of the input pinion shaft 116, the second axleshafts 102L and 102R, the second differential case 124, the spool 120 and the clutch output shaft 138 are shown with suitable bearings assembled thereon for rotatably supporting each within or from the housing 108. In addition, FIG. 11 specifically shows that the spool 120 is fixed for rotation via a splined connection 156 with an annular sleeve portion 158 of a clutch hub 160 which defines the input clutch member 130. Likewise, the output clutch member 132 can be a clutch drum 162 that is coupled via a splined connection 164 for rotation with a first end of the clutch output shaft 138. The opposite end of the clutch output shaft 138 is fixed via a splined connection 166 to a tubular boss portion 168 of the second differential case 124. The engagement member 136 can be an apply piston disposed in the pressure chamber which is supplied with pressurized hydraulic fluid by a hydraulically-operated unit 169 associated with the TTD actuator 114. The hydraulically-operated unit 169 can include a motor-driven fluid pump 170, an accumulator 172 and related hydraulic components, all of which are disposed in close proximity to or attached to the housing 108.

With reference to FIGS. 1, 2 and 7, the vehicle 10 can normally be operated in the two-wheel drive (FWD) mode in which the power take-off unit 18 and the rear drive module 100 are both disengaged. Specifically, the mode collar 80 of the disconnect mechanism 54 is positioned by the disconnect actuator 56 in its first (2WD) mode position such that the input shaft 58 is uncoupled from the transfer shaft 64. As such, substantially all power provided by the powertrain 12 is transmitted to the primary driveline 16. Likewise, the torque transfer device 112 can be shifted into and maintained in its first (disconnected) mode such that the input 106, the propshaft 86, the output pinion shaft 60 and the transfer gear assembly 52 within the power take-off unit 18 are not back-driven due to rolling movement of the second vehicle wheels 104.

When it is desired or necessary to operate the motor vehicle 10 in the all-wheel drive (AWD) mode, the control system 22 can be activated via a suitable input which, as noted, can include a drive requested input (via the mode select device) and/or an input generated by the controller 150 in response to signals from the first sensors 152 and/or the second sensors 154. The controller 150 initially signals the TTD actuator 114 to shift the torque transfer device 112 into its second (connected) mode. Specifically, the controller 150 controls operation of the TTD actuator 114 such that the actuation member 136 is moved and a clutch engagement force is exerted on the clutch pack 134 that is sufficient to synchronize the speed of the secondary driveline 20 with the speed of the primary driveline 16. Upon speed synchronization, the controller 150 signals the actuator 56 to cause the mode collar 80 in the power take-off unit 18 to move from its first mode position into its second mode position. With the mode collar 80 in its second mode position, rotary power is transmitted from the powertrain 12 to the primary driveline 16 and the secondary driveline 20. It will be appreciated that subsequent control of the magnitude of the clutch engagement force generated by the torque transfer device 112 permits torque biasing across the clutch pack 134 for controlling the torque distribution ratio transmitted from the powertrain 12 to the primary driveline 16 and the secondary driveline 20.

Figure 12:
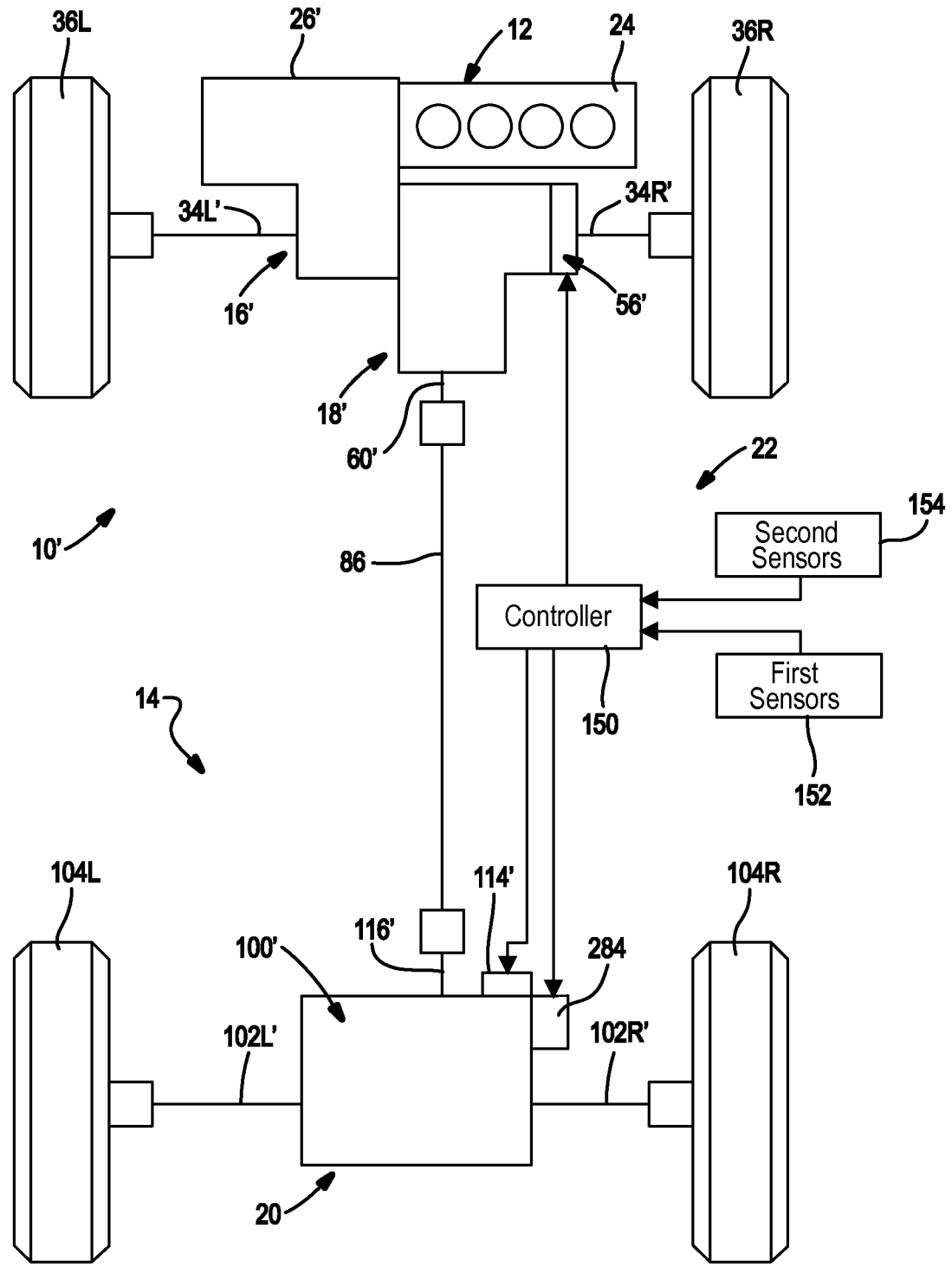
FIG. 12 is a schematic of a motor vehicle equipped with another configuration of a disconnectable all-wheel drive system constructed in accordance with the present teachings.

With reference to FIG. 12, another motor vehicle constructed in accordance with the present teachings is generally indicated by reference numeral 10'. The vehicle 10' is generally similar to the vehicle 10 of FIG. 1 except that the primary driveline 16' and the secondary driveline 20' have been modified to incorporate a two-speed range unit into both the power take-off unit 18' and the rear drive module 100'. As will be detailed, this alternative drivetrain arrangement for the vehicle 10' permits establishment of at least one all-wheel low range drive mode in addition to the two-wheel high-range drive mode and the all-wheel high-range drive mode associated with vehicle 10. For purposes of clarity, primed reference numeral are used to designate components that are generally similar in structure and/or function to the non-primed components previously described in relation to FIGS. 1 through 11.

Figure 13:
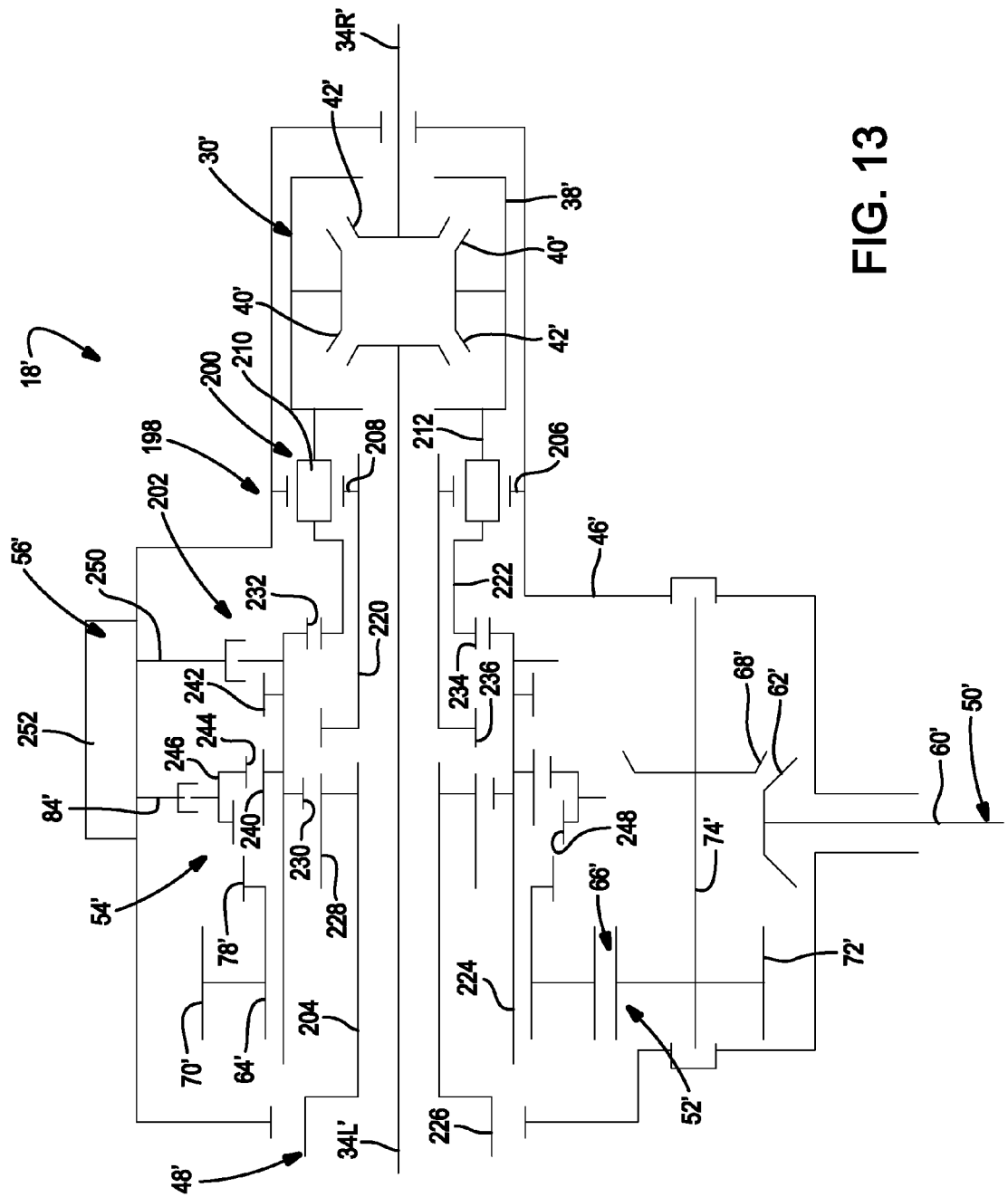
FIG. 13 is a schematic illustration of a two-speed power take-off unit associated with the disconnectable all-wheel drive system of FIG. 12.

With additional reference now to FIG. 13, the power take-off unit 18' is generally shown to include a housing 46', an input 48' adapted for connection to an output member of the transmission 26', an output 50', a transfer gear assembly 52', a first differential 30', a disconnect mechanism 54', a two-speed range unit 198, and a disconnect actuator 56'. The input 48' can include a hollow input shaft 204 rotatably supported by the housing 46' and surrounding the axleshaft 34L'. The output 50' can include an output pinion shaft 60' having a pinion gear 62'. The transfer gear assembly 52' can include a hollow transfer shaft 64', a helical gearset 66', and a hypoid gear 68' meshed with the pinion gear 62'. The helical gearset 66' can include a first helical gear 70' fixed for rotation with the transfer shaft 64' and a second helical gear 72' that is meshed with the first helical gear 70'. The second helical gear 72' and the hypoid gear 68' are integral with or fixed to a stub shaft 74' that is rotatably supported by the housing 46'.

The two-speed range unit 198 can include a planetary gear assembly 200 and a range shift mechanism 202. The planetary gear assembly 200 can include a ring gear 206 non-rotatably fixed to the housing 46', a sun gear 208, a plurality of planet gears 210 meshed with both the ring gear 206 and the sun gear 208, and a planet carrier 212 from which the planet gears 210 are rotatably supported. The planet carrier 212 is fixed to, or integrally formed with, the first differential case 38' of the first differential 30' for common rotation therewith.

The range shift mechanism 202 can include a sun gear shaft 220 surrounding a portion of the first axleshaft 34L' and which is fixed for rotation with the sun gear 208, a carrier shaft 222 surrounding a portion of the sun gear shaft 220 and which is fixed for rotation with the planet carrier 212, and a tubular range sleeve 224 surrounding portions of the carrier shaft 222, the sun gear shaft 220 and the input shaft 204. The input shaft 204 can have a first end 226 adapted for connection via a splined coupling shaft 227 (FIG. 14) to the output of transmission 26' and a second end having a set of elongated external spline teeth 228 formed thereon. The range sleeve 224 can include a set of internal spline teeth 230 that are in continuous meshed engagement with the external spline teeth 228 on the input shaft 204. As such, the range sleeve 224 is coupled for common rotation with the input shaft 204 while being capable of bi-directional axial sliding movement thereon between a plurality of predefined range position which will be discussed hereinafter in greater detail. The range sleeve 224 further defines a set of internal clutch teeth 232 that can be moved into and out of engagement with a set of external clutch teeth 234 formed on the carrier shaft 222 or a set of external clutch teeth 236 formed on the sun gear shaft 220.

The disconnect mechanism 54' is generally similar in function to the disconnect mechanism 54 in that it is configured to selectively connect the input shaft 204 to the transfer gear assembly 52' for transmitting rotary power from the input shaft 204 to the output pinion shaft 60' when the all-wheel drive mode is desired. However, the disconnect mechanism 54' differs in that the drive connection between the input shaft 204 and the transfer shaft 64' is made indirectly via the range sleeve 224. In particular, the range sleeve 224 can include first and second sets of external spline teeth 240 and 242, respectively, which are selectably engageable with internal spline teeth 244 formed on a mode collar 246. As such, the mode collar 246 can be coupled for rotation with the range sleeve 224 and is capable of bi-directional axial translation relative to the range sleeve 224 between a first (2WD) mode position and a second (AWD) mode position.

In the first mode position, a set of internal clutch teeth 248 formed on the mode collar 246 are released from meshed engagement with the external clutch teeth 78' on the transfer shaft 64', whereby no rotary power is transmitted from the input shaft 204 through the transfer gear assembly 52' to the output pinion shaft 60'. In contrast, with the mode collar 246 in its second mode position, its internal spline teeth 244 are engaged with one of the first and second sets of external splines 240 and 242 (depending on the axial position of the range sleeve 224) and its internal clutch teeth 248 are engaged with the clutch teeth 78' on the transfer shaft 64', thereby establishing a drive connection between the input shaft 204 and the output pinion shaft 60'.

The two-speed range unit 198 is operable to establish at least two different speed ratio drive connections between the input shaft 204 and the first differential 30'. Specifically, the range sleeve 224 can be axially translated between a plurality of predefined range positions. In a first or "high" (Hi) range position, the range sleeve 224 is located such that its internal clutch teeth 232 are engaged with the external clutch teeth 234 on the carrier shaft 222. Since the internal splines 230 on the range sleeve 224 remain in constant meshed engagement with the external spline teeth 228 on the input shaft 204, location of the range sleeve 224 in its high-range position results in establishing a direct drive connection between the input shaft 204 and the carrier shaft 222 which, in turn, is connected via the carrier 212 to the first differential case 38'. As such, a first or direct ratio drive connection is established between the input shaft 204 and the first differential 30'.

In a second or "neutral" range position, the range sleeve 224 is disconnected from driven connection with both of the carrier shaft 222 and the sun gear shaft 220 such that the input shaft 204 is disconnect from the first differential 30'.

In a third or "low" (Low) range position, the range sleeve 224 is located such that its internal clutch teeth 232 are engaged with the external clutch teeth 236 formed on the sun gear shaft 220. With the range sleeve 224 located in its low-range position, a second or reduced-ratio drive connection is established between the input shaft 204 and the first differential 30'. Specifically, driven rotation of the sun gear shaft 220 causes the planetary gear assembly 200 to drive the carrier 212 at a reduced speed relative to the input shaft 204 such that the primary driveline 16' is likewise driven at the reduced speed ratio via the first differential 30'.

With continued reference to FIG. 13, the disconnect actuator 56' is shown positioned adjacent to the housing 46' and can include a first shift fork 84' engaging the mode collar 246, a second shift fork 250 engaging the range sleeve 224, and a power-operated unit 252 configured to receive control signals from the controller 150 and operable to coordinate movement of the shift forks 84' and 250. The power-operated unit 252 can be any type of unit capable of selectively translating the first shift fork 84' for causing movement of the mode collar 246 between its two mode positions while also selectively translating the second shift fork 250 for causing movement of the range sleeve 224 between its three range positions.

Figure 14:
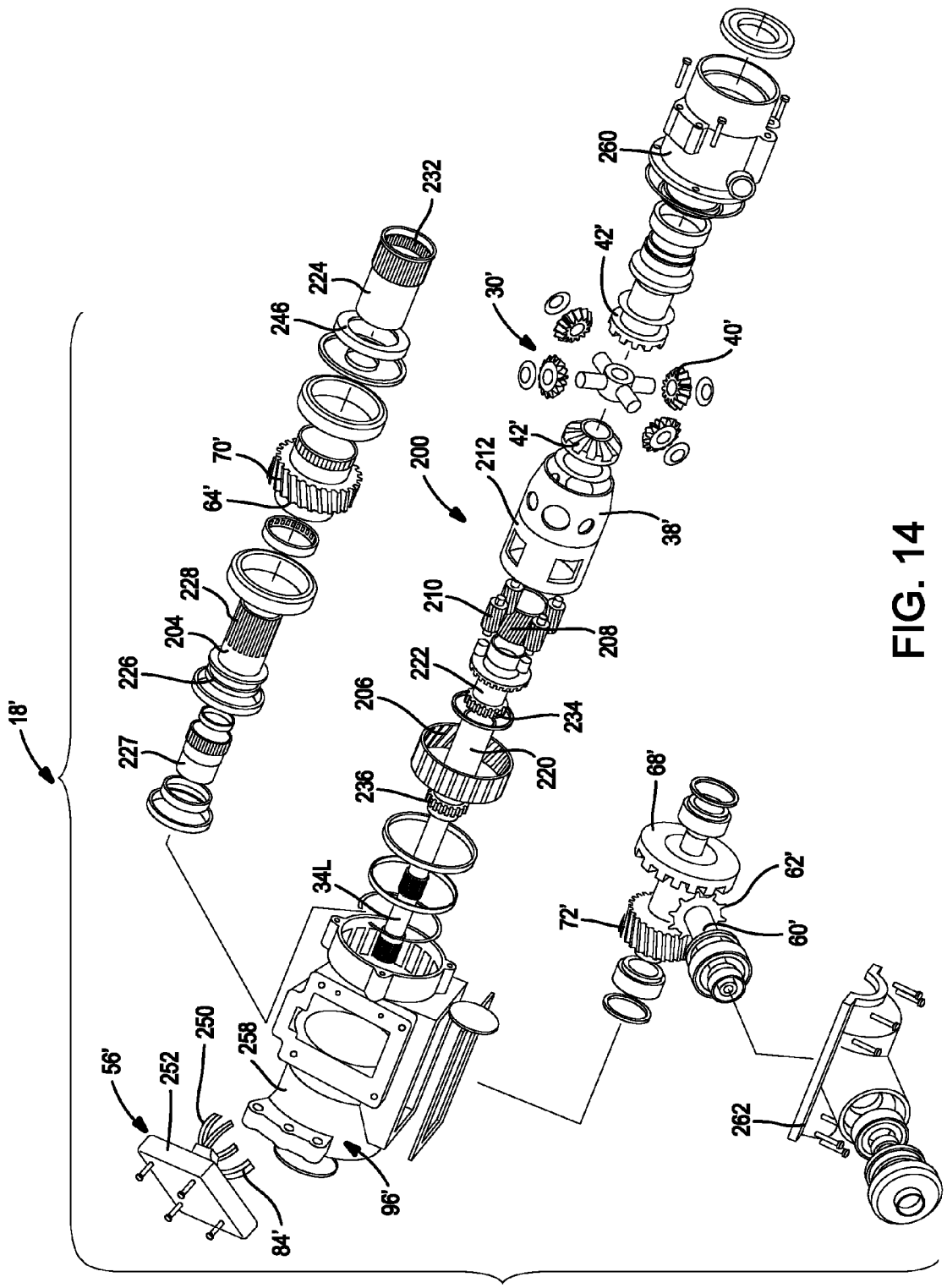
FIG. 14 is an exploded perspective view of a two-speed power take-off unit based on the schematic shown in FIG. 13 and which is constructed in accordance with the present teachings.
Figure 15:
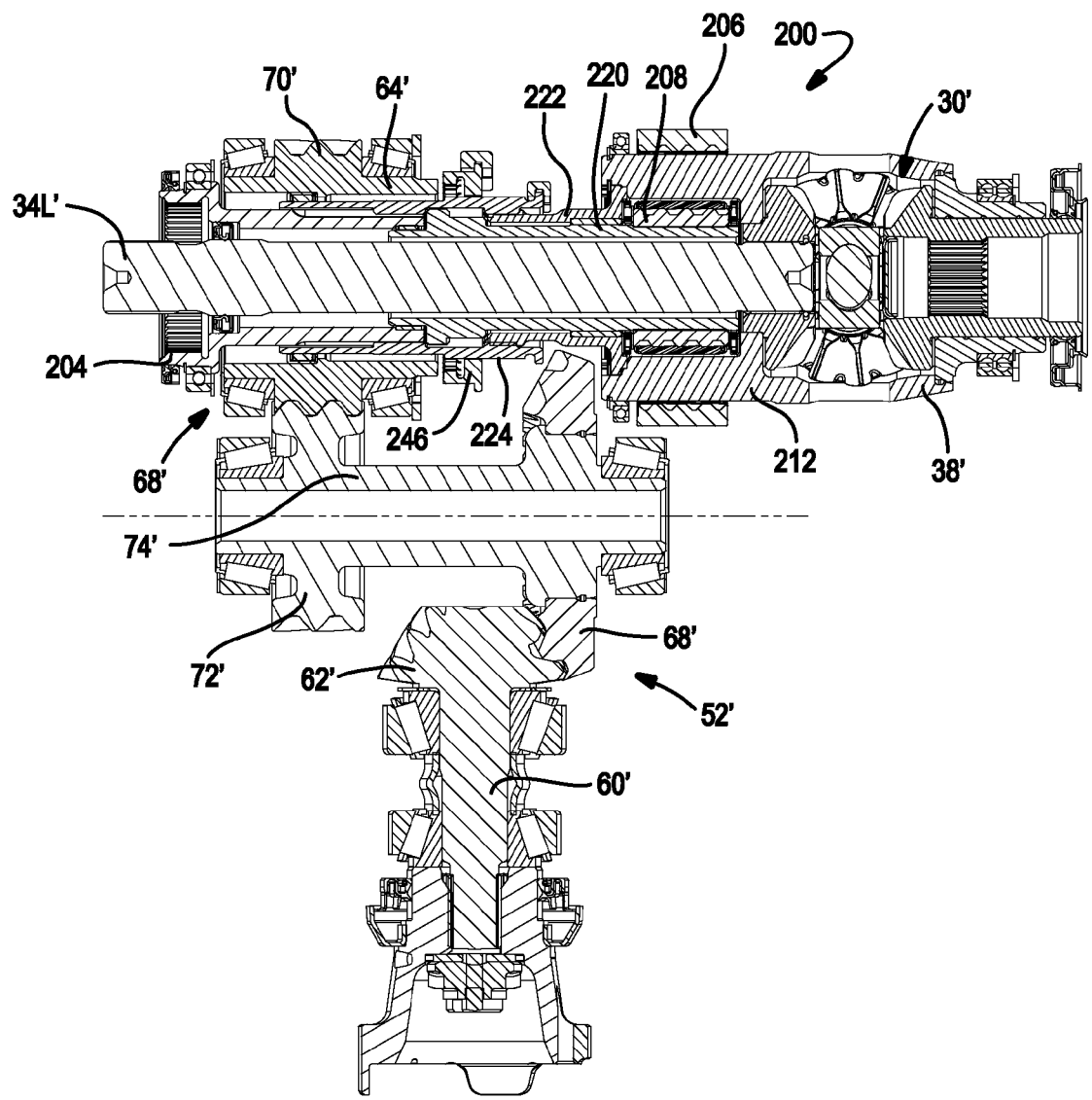
FIG. 15 is a sectional view of the two-speed power take-off unit shown in FIG. 14.

With reference now to FIGS. 14 and 15, a more definitive structural configuration of the components associated with the two-speed power take-off unit 18' is shown. In particular, FIG. 14 illustrates an exploded perspective view of an exemplary embodiment of the two-speed power take-off unit 18'. Housing 46' is shown to include a multi-piece assembly having a main housing 258 to which a differential housing 260 and a PTU housing 262 are secured. FIG. 15 is a sectional view which illustrates the compact arrangement of the planetary gear assembly 200, the range shift mechanism 202, the transfer gear assembly 52', and the moveable mode collar 246 and range sleeve 224.

As will be understood, the bi-directional translational movement of the range sleeve 224 and the mode collar 246 can be coordinated to establish a plurality of mode and range combinations for the two-speed power take-off unit 18' based on control signals from the controller 150. Referring to FIGS. 16A through 16D, these various mode and range combinations can be more clearly illustrated.

Figure 16A:
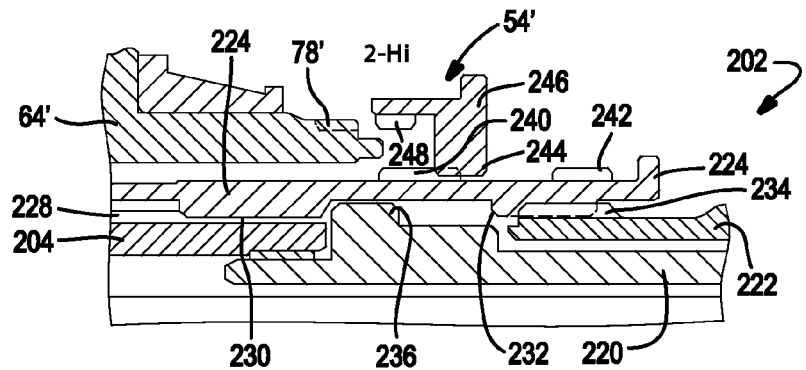
FIGS. 16A through 16D are partial sectional views of the two-speed power take-off unit shown in FIG. 15 with its mode and range shift components positioned to define a two-wheel high-range (2-Hi) mode, a four-wheel high-range (4-Hi) mode, a neutral mode, and a four-wheel low-range (4-Low) mode, respectively.

FIG. 16A shows the positions of the range sleeve 224 and the mode collar 246 for establishing a two-wheel high-range (2-Hi) mode. Specifically, the mode collar 246 is shown located in its first mode position while the range sleeve 224 is located in its first range position. As such, the input shaft 204 is coupled via the range sleeve 224 to the carrier shaft 222 for establishing the direct drive connection between the powertrain 12 and the primary driveline 16'. Concurrently, the transfer shaft 64' is disconnected from driven connection with the input shaft 204, thereby disconnecting the secondary driveline 20' from the powertrain 12. Thus, rotary power is only transmitted by the powertrain 12 to the primary driveline 16' without speed reduction.

Figure 16B:
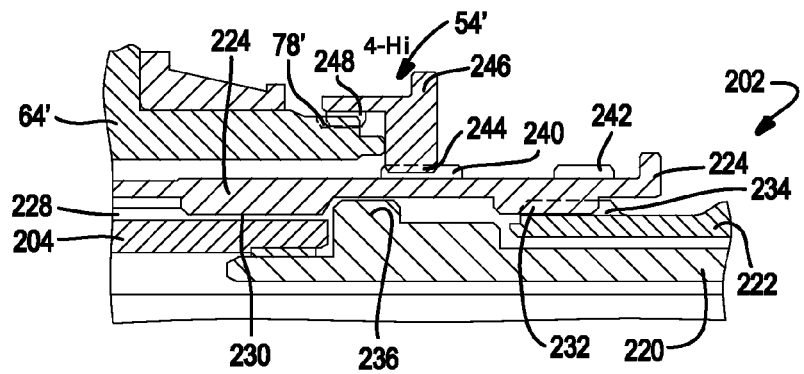

FIG. 16B shows the positions of the range sleeve 224 and the mode collar 246 for establishing a four-wheel high-range (4-Hi) mode. Specifically, the high-range connection is maintained by the range sleeve 224 remaining in its first range position while the mode collar 246 is shown moved into its second mode position. Thus, the mode collar 246 establishes a drive connection from the input shaft 204 (through the range sleeve 224) to the transfer shaft 64' for also transmitting rotary power from the powertrain 12 to the secondary driveline 20' without speed reduction.

Figure 16C:
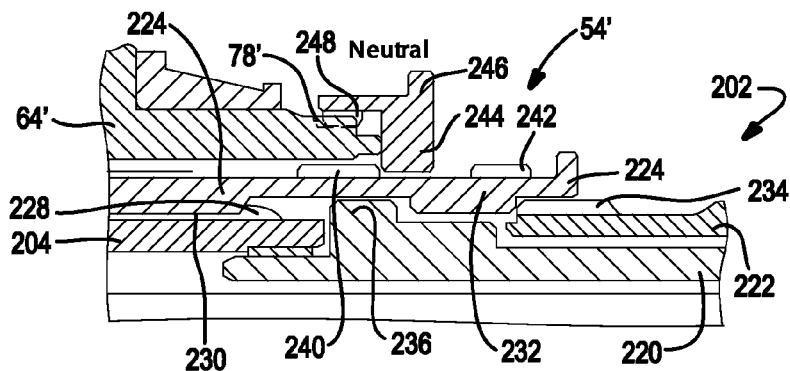

FIG. 16C shows the positions of the range sleeve 224 and the mode collar 246 for establishing a Neutral non-driven mode. As seen, the mode collar 246 is maintained in its second mode position while the range sleeve 224 has been axially moved into its second range position such that its internal splines 232 are disengaged from the external clutch teeth 234 on the carrier shaft 220 and the external clutch teeth 236 on the sun gear shaft 220. Thus, the input shaft 204 is disconnected from both inputs to the primary driveline 16' such that no rotary power is transmitted from the powertrain 12 to the primary driveline 16'. It will also be noted that such movement of the range sleeve 224 to its second range position causes the internal spline teeth 244 on the mode collar 246 to disengage the first set of external splines 240 on the range sleeve 224 while the mode collar 246 maintains its connection with the transfer gear 64'.

Figure 16D:
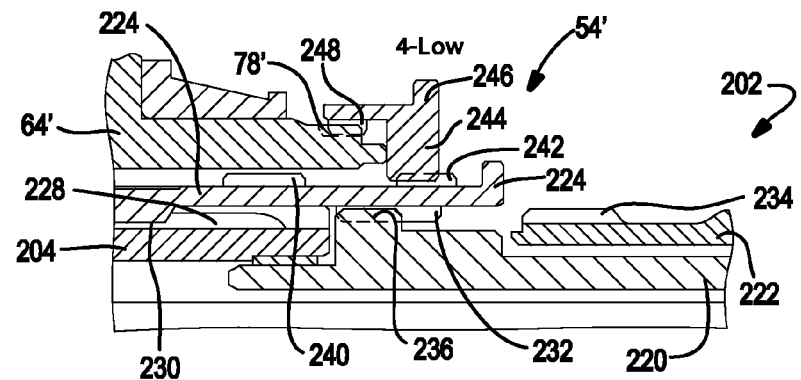

FIG. 16D shows the position of the mode collar 246 and the range sleeve 224 for establishing a four-wheel low-range (4-Low) mode. Specifically, the mode collar 246 is maintained in its second mode position while the range sleeve 224 is moved axially into its third range position. As such, the low-range drive connection is established by the range sleeve 224 between the input shaft 204 and the sun gear shaft 220 while the AWD connection is established by the mode collar 246. It will be noted that the internal spline teeth 244 of the mode collar 246 engage the second set of external spline teeth 242 upon movement of the range sleeve 224 from its neutral range position into its low range position. While it is possible to provide the external splines 240 and 242 on the range sleeve 224 in a continuous arrangement, the non-toothed separation space therebetween has been recognized to inhibit potential tooth blocking conditions upon movement of the range sleeve 224 between its high-range and low-range positions.

With particular reference now to FIGS. 12 and 17, the secondary driveline 16' can include the propshaft 86, a two-speed rear drive module 10', a pair of second axleshafts 102L' and 102R', and the set of second vehicle wheels 104L and 104R. A first end of the propshaft 86 is coupled to the output pinion shaft 60' extending from the two-speed power take-off unit 18' while a second end of the propshaft 86 is coupled for rotation with an input 106' of the two-speed rear drive module 100'. The rear drive module 100' can include a housing 108', a second differential 110', a torque transfer device 112' generally configured and arranged to selectively couple and transmit rotary power from the input 106' to the second differential 110', a TTD actuator 114' for controlling actuation of the torque transfer device 112', a two-speed range unit 278 having a planetary gear assembly 280 and a range shift mechanism 282, and a range actuator 284.

The input 106' can include an input pinion shaft 116' having a pinion gear 118', a hollow spool 120', and a hypoid gear 122' fixed to the spool 120' and which is meshed with the pinion gear 118'. The second differential 110' includes a second differential case 124', at least one pair of second pinion gears 126' rotatably supported by the second differential case 124', and a pair of second output side gears 128' that are meshed with the second pinion gears 126'. The second output side gears 128' are fixed for rotation with the inboard ends of the second axleshafts 102L' and 102R'.

Torque transfer device 112' is generally similar to torque transfer device 112 and can include an input clutch member 130', an output clutch member 132', a clutch pack 134', and an engagement member 136' that is moveable under the control of the TTD actuator 114' based on control signals from the controller 150. The output clutch member 132' can be a clutch drum 162' that is coupled for rotation with a clutch output shaft 286. Thus, torque transferred from the input 106' through the torque transfer device 112' is transmitted to the clutch output shaft 286.

The two-speed range unit 278 is operable to establish at least two different speed ratio drive connections between the output clutch member 132' and the second differential 110'. Specifically, the planetary gear assembly 280 can include a sun gear 290 fixed for rotation with the clutch output shaft 286, a ring gear 292 non-rotatably fixed to the housing 108', a plurality of planet gears 294 meshed with the sun gear 290 and the ring gear 292, and a planet carrier 296 from which the planet gears 294 are rotatably supported. The range shift mechanism 282 can include a first or direct clutch ring 300 fixed for rotation with the clutch output shaft 286, a second or low clutch ring 302 fixed for rotation with the planet carrier 296, a third or drive clutch ring 304 fixed for rotation with a differential input shaft 306, a fourth or lock clutch ring 308 fixed for rotation with the second axleshaft 102R', and a range sleeve 310. The differential input shaft 306 can surround the second axleshaft 102R' and is connected for rotation with the second differential case 124' of the second differential 110'.

The range sleeve 310 can include a set of internal spline teeth 312 that are in continuous meshed engagement with a set of external spline teeth 314 formed on the drive clutch ring 304. As such, the range sleeve 310 is coupled for common rotation with the drive clutch ring 304 while being capable of bi-directional axial sliding movement thereon. The range sleeve 310 further includes a set of internal clutch teeth 316. As will be detailed, translational movement of the range sleeve 310 is operable to establish the two different speed range drive connections between the output shaft 286 of the torque transfer device 112' and the second differential case 124' of the second differential 110'.

Figure 17A:
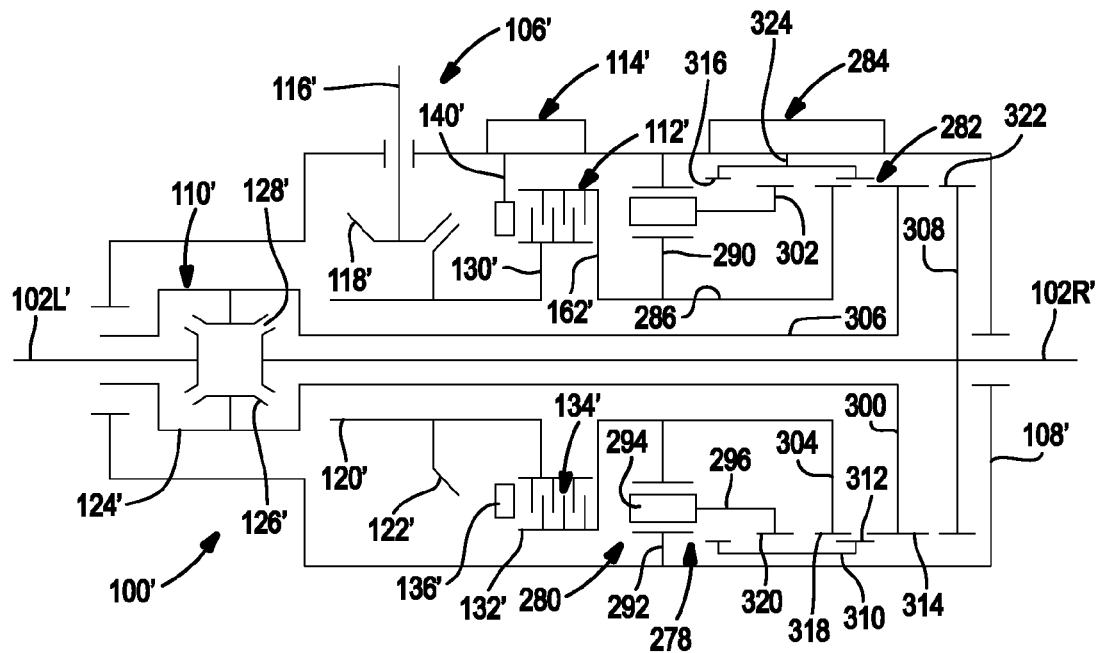
FIGS. 17A through 17D are schematic illustrations of a two-speed rear drive module associated with the disconnectable all-wheel drive system of FIG. 12 with its range shift components positioned to define a high-range (H) mode, a neutral (N) mode, a low-range (L) mode, and a low-range locked (LOCK) mode, respectively.

The range sleeve 310 is shown in FIG. 17A positioned in a first or high range position such that its internal spline teeth 312 are meshed with both the external spline teeth 314 on the drive clutch ring 304 and with a set of external spline teeth 318 formed on the direct clutch ring 300. It will also be seen that the clutch teeth 316 on the range sleeve 310 are disengaged from meshed engagement with a set of external clutch teeth 320 formed on the low clutch ring 302. Thus, a first or direct ratio drive connection is established between the output clutch member 132' and the second differential case 124' of the second differential 110' via the clutch output shaft 286, the range sleeve 310 and the differential input shaft 306.

Figure 17B:
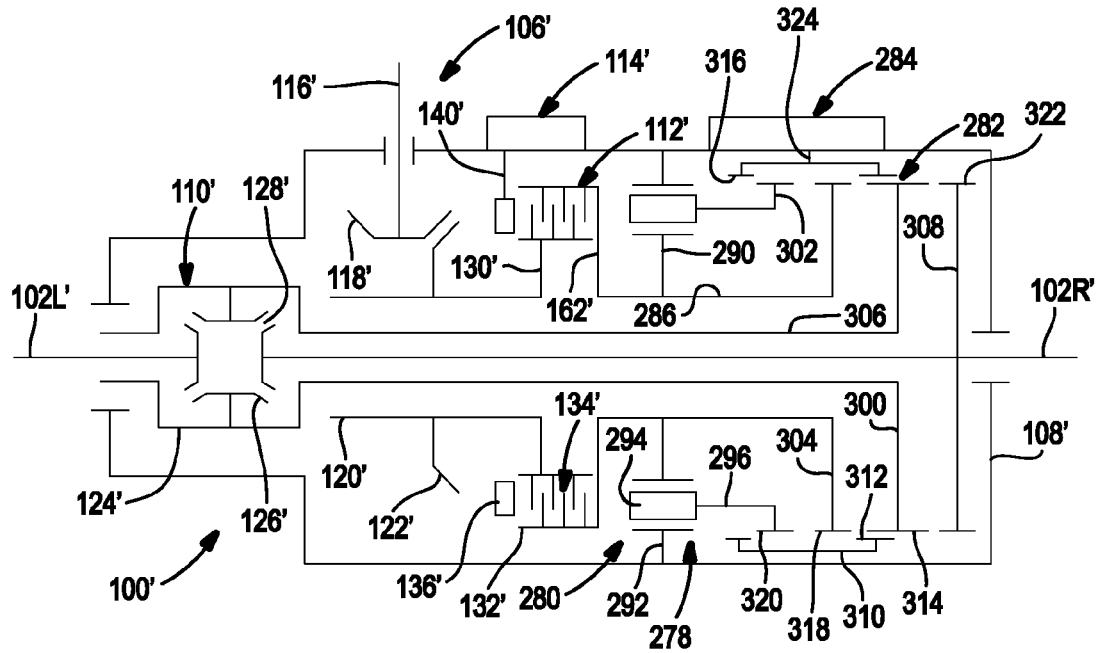

The range sleeve 310 is shown in FIG. 17B positioned in a second or neutral position such that its internal teeth 312 remain engaged only with the external teeth 314 on the drive clutch ring 304 while its internal clutch teeth 316 remain disengaged from the external clutch teeth 320 on the low clutch ring 302. As such, the output clutch member 132' is released from driven connection with the second differential case 124' of the second differential 110'.

Figure 17C:
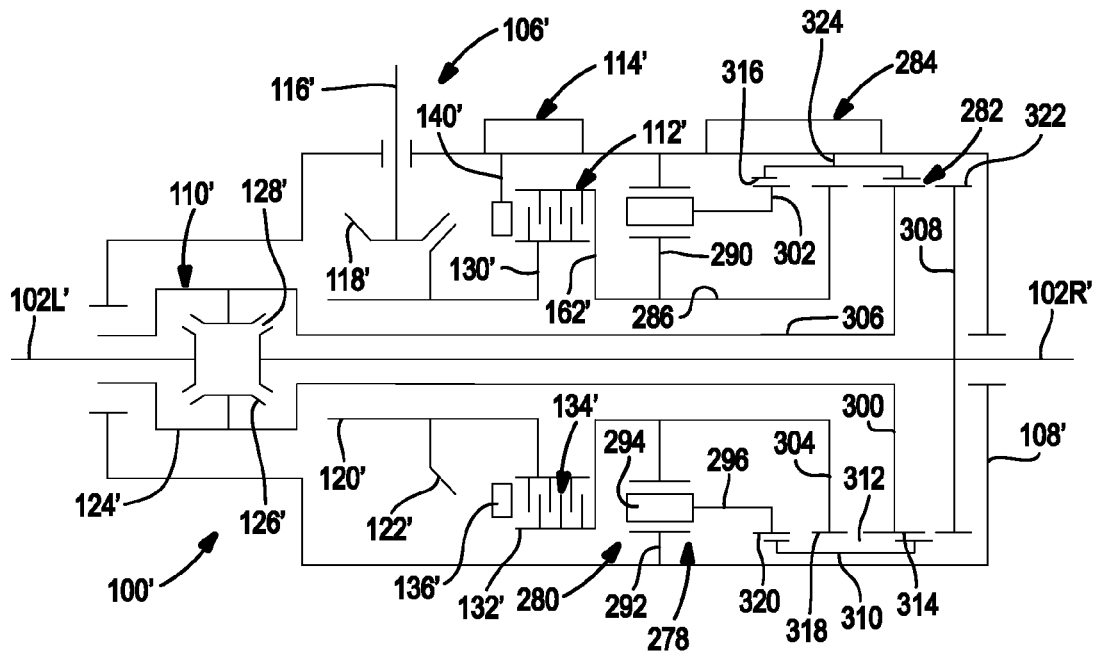

The range sleeve 310 is shown in FIG. 17C positioned in a third or low range position such that its internal spline teeth 312 remain meshed with the external spline teeth 314 on the drive clutch ring 304 while its internal clutch teeth 316 are now meshed with the external clutch teeth 318 on the low clutch ring 302. As such, driven rotation of the sun gear 290 (via the clutch output shaft 286) causes the planet carrier 296 to rotate at a reduced speed to establish a second or reduced ratio drive connection between the output clutch member 132' and the differential case 124' via the carrier 296, the low clutch ring 302, the range sleeve 310, the drive clutch ring 304, and the second differential input shaft 306.

Figure 17D:
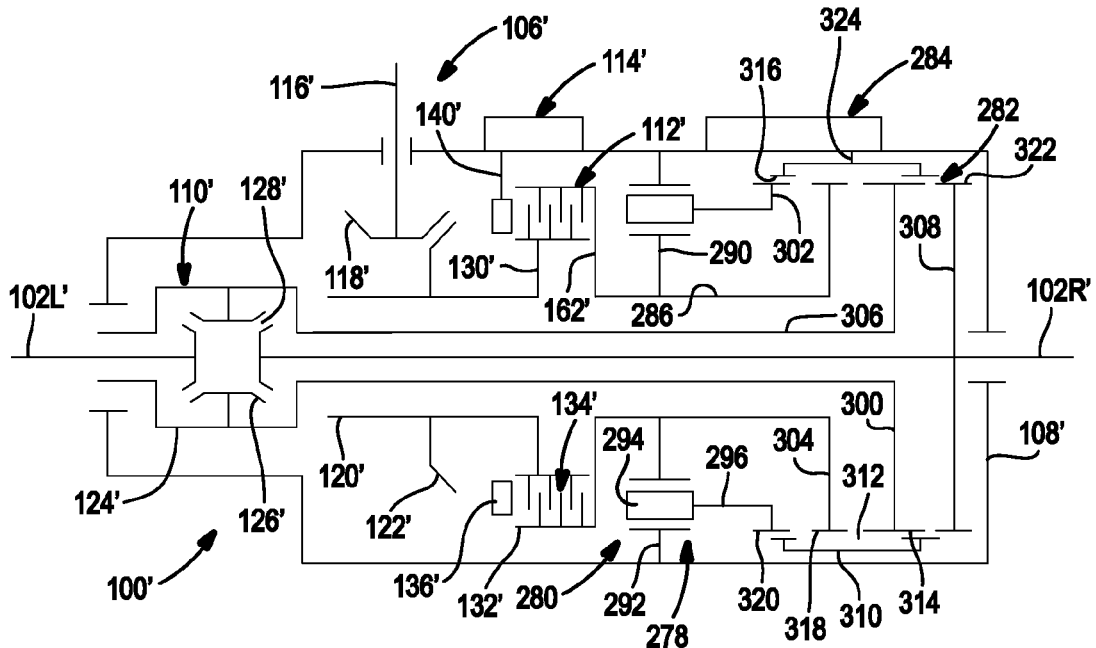
Figure 18:
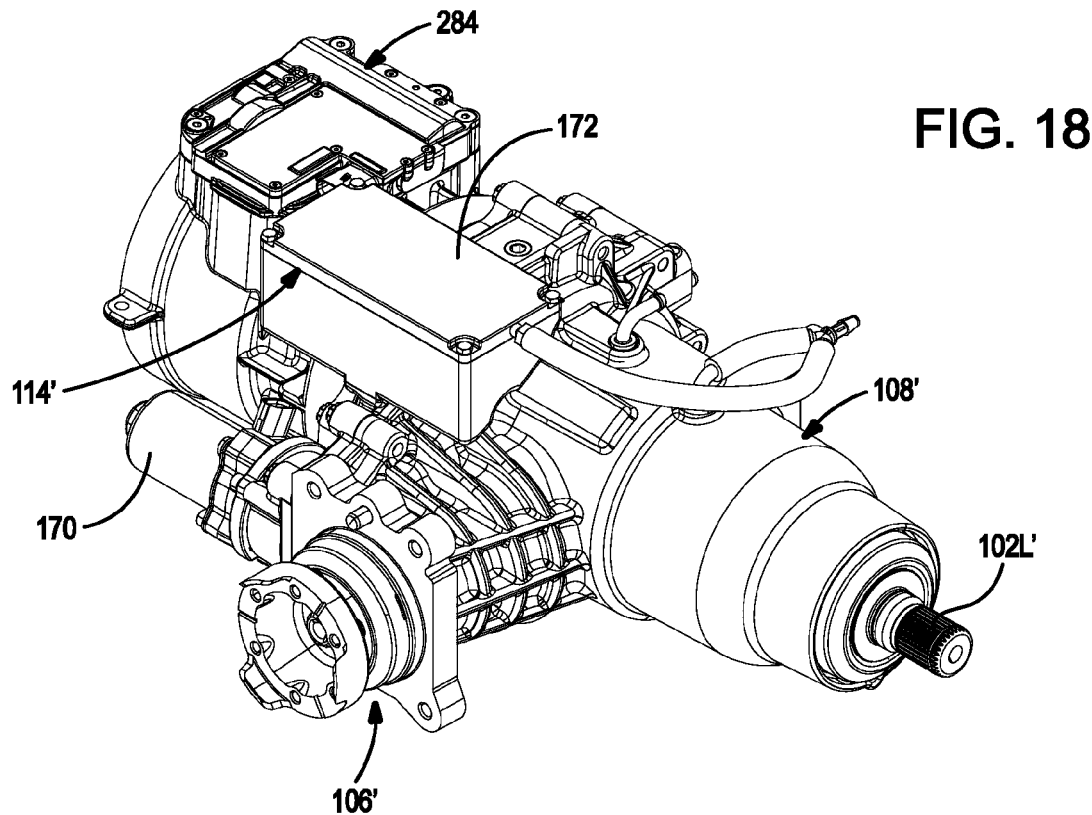
Figure 19:
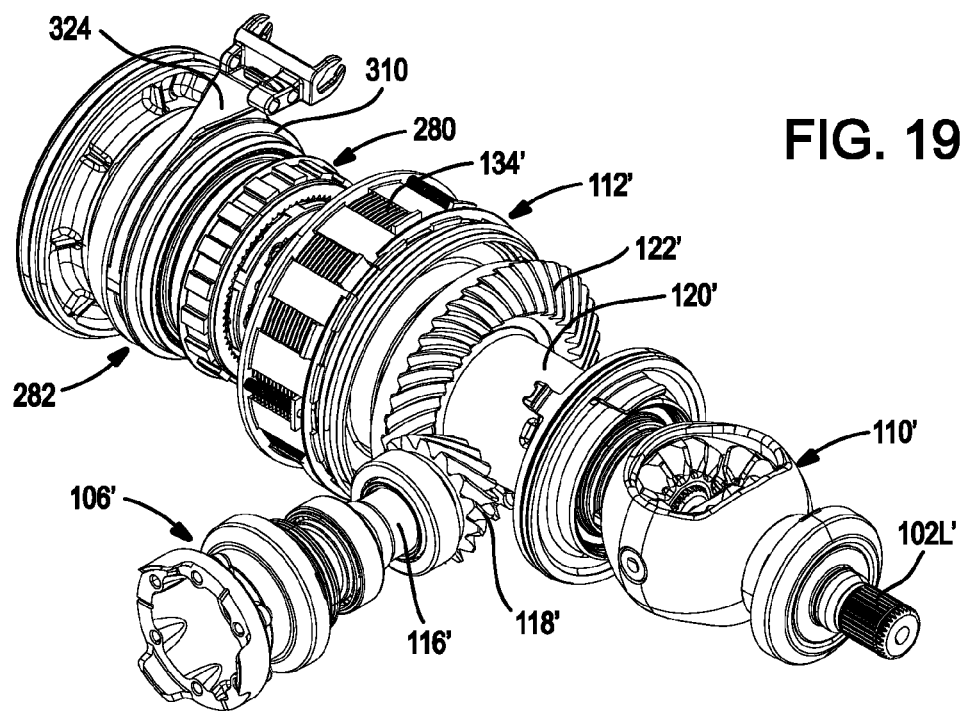
Figure 22:
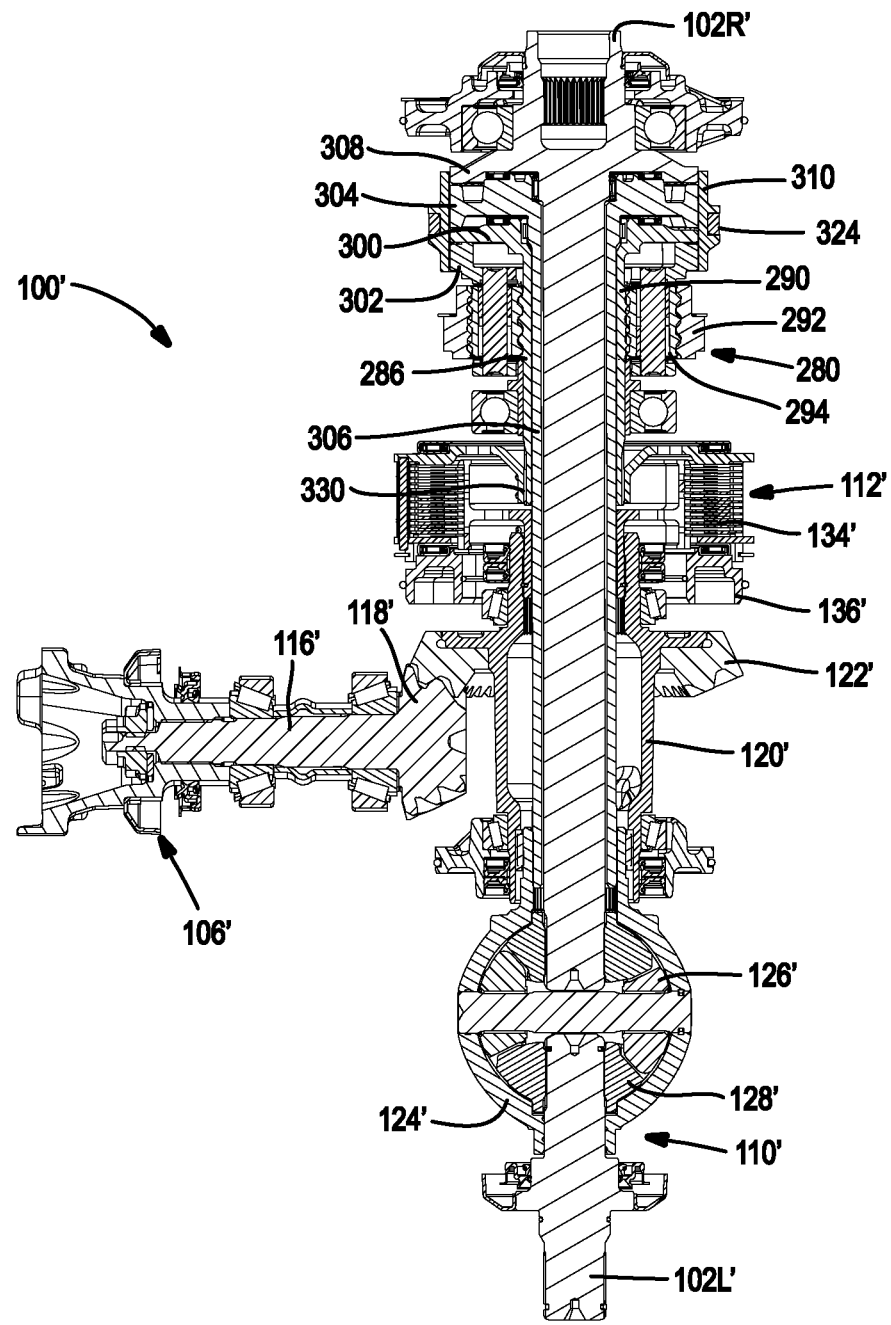
FIG. 22 is a sectional view taken generally along line 22-22 of FIG. 21.

Finally, FIG. 17D shows the range sleeve 310 positioned in a fourth or low locked position. In this position, the internal spline teeth 312 on the range sleeve 310 are meshed with both the external spline teeth 314 on the drive clutch ring 304 and a set of external spline teeth 322 formed on the lock clutch ring 308 while the internal clutch teeth 316 on the range sleeve 310 remain engaged with the external clutch teeth 320 on the low clutch ring 302. In this position, the reduced ratio drive connection of FIG. 17C is maintained with the addition that the second differential 110' is now locked since the second differential case 124' and the second axleshaft 102R are prevented from rotating relative to each other.

With continued reference to FIGS. 17A through 17D, the range actuator 284 can be any type of power-operated mechanism that is operable to control axial translational movement of a range fork 324 which, in turn, causes movement of the range sleeve 310 between its four distinct range positions. The range actuator 284 is shown mounted to housing 108' of the two-speed rear drive module 100'. The range actuator 284 is preferably a motor-driven geared device configured to receive control signals from the controller 150 to convert rotation of the motor output into translational movement of the range fork 324.

As noted, FIGS. 17A through 17D schematically illustrate the components that can be associated with the two-speed rear drive module 100'. Reference now to FIGS. 18-22 will provide a more definitive structural configuration of such components that are associated with an exemplary embodiment of the two-speed rear drive module 100'. In particular, a splined connection 330 is provided to couple the clutch drum 162' to a first end of the clutch output shaft 286. It is also shown that the sun gear 290 can be formed integrally with the clutch output shaft 286.

Figure 23:
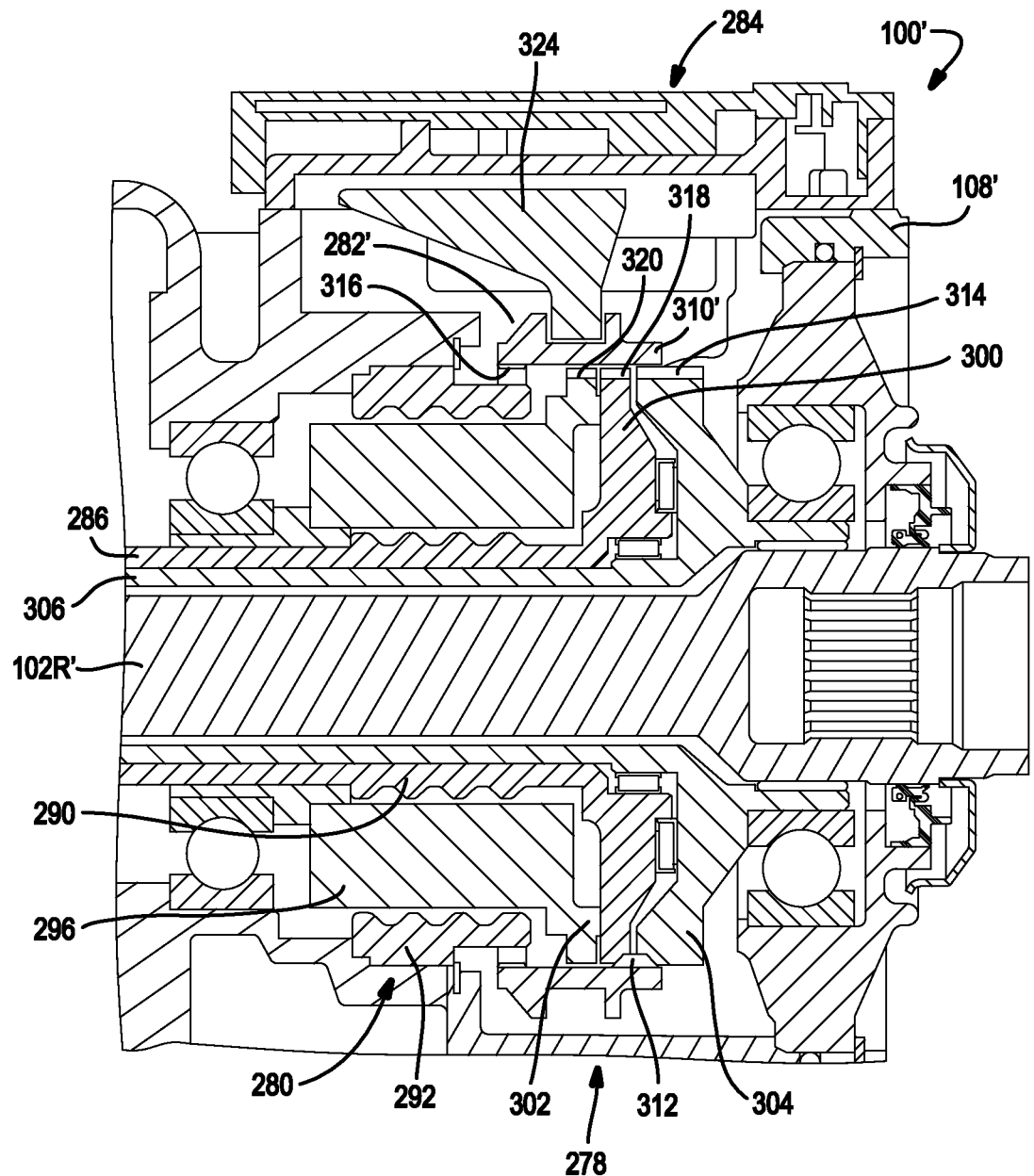
FIG. 23 is a partial sectional view of an alternative exemplary embodiment of a two-speed rear drive module configured for use with the disconnectable all-wheel drive system of FIG. 12.

With reference to FIG. 23, a partial sectional view of an alternative exemplary embodiment of the two-speed rear drive module 100' is shown which incorporates a modified range shaft mechanism 282'. In essence, the range shift mechanism 282' is substantially similar to the range shift mechanism 282 shown in FIGS. 17A-22 with the exception that the low lock clutch ring 308 has been eliminated to thereby eliminate the low locked range mode shown in FIG. 17D. Thus, the range sleeve 310' may be slightly modified in construction but is still operable to establish the high-range, neutral, and low range drive connections between the clutch output shaft 286 and the differential input shaft 306.

In operation, the vehicle 10' can normally be operated in a two-wheel high-range drive mode in which the power take-off unit 18' establishes a high-range drive connection between the powertrain 12 and the primary driveline 16' while the rear drive module 100' is disengaged. Specifically, the range sleeve 224 and mode collar 246 respectively associated with the range shift mechanism 202 and the disconnect mechanism 54' are located as shown in FIG. 16A to establish the 2-Hi mode. With the mode collar 246 in its first mode position, the input shaft 204 is disconnected from the transfer shaft 64' such that substantially all rotary power is transferred from the powertrain 12 to the primary driveline 16'. The torque transfer device 112' is maintained in its first (disconnected) mode to disconnect the secondary driveline 20'. While the torque transfer device 112' is operating in its disconnected mode, the range sleeve 310 can be located in its high-range position (FIG. 17A).

When it is desired or necessary to operate the motor vehicle 10' in an all-wheel high-range (AWD-H) drive mode, the control system 22 can be activated to initially signal the TTD actuator 114' to shift the torque transfer device 112' into its second (connected) mode for synchronizing the speeds of the primary driveline 16' and the secondary driveline 20'. Upon synchronization, the controller 150 signals the actuator 56' to shift the mode collar 246 to its second mode position while maintaining the range sleeve in its first range position (FIG. 16B). This establishes a four-wheel high-range drive connection between the powertrain 12, the primary driveline 16' and the input 106' to the rear drive module 100'. In addition, the range actuator 284 can be actuated to maintain or move the range sleeve 310 into its high-range position (FIG. 17A) such that rotary power delivered through the torque transfer device 112' is transmitted to the second differential 110' at the direct speed ratio. Thereafter, the TTD actuator 114' can be controlled to vary the torque transmitted through the torque transfer device 112' to the second vehicle wheels 104L, 104R with the second differential 110' operating in an open state for permitting speed differentiation between the second vehicle wheels 104L, 104R.

If during operation of the vehicle 10' in its AWD-H drive mode, it is desired or determined that improved traction requires operation in an all-wheel drive low-range (AWD-L) drive mode, the control system 22 functions to coordinate shifting of the power take-off unit 18' into its four-wheel low-range mode and the rear drive module 100' into its low-range mode. Specifically, the positions of the mode collar 246 and the range sleeve 224 of the power take-off unit 18' to establish this connection are shown in FIG. 16D while the position of the range sleeve 310 of the rear drive module 100' to establish this connection is shown in FIG. 17C. Thus, the low-range drive connections are established in the power take-off unit 18' and the rear drive module 100'. These low-range drive connections can be established sequentially or concurrently based on a suitable control method and can be established with the vehicle 10' in a stationary or non-motive state.

If during operation of the vehicle 10' in its AWD-L drive mode, it is desired or determined that locking of the second differential 110' would assist in providing even greater traction, the control system 22 can request operation of the vehicle in an all-wheel drive low-lock range (AWD-LOCK) drive mode. This entails signaling the range actuator 284 to shift the range sleeve 310 into its low lock position (FIG. 17D) while maintaining the power take-off unit 18' in its four-wheel low-range mode (FIG. 16D).

Finally, a towing mode for the vehicle 10' can be established by shifting the power take-off unit 18' into its neutral mode (FIG. 16C) and shifting the rear drive module 100' into its neutral mode (FIG. 17B).

While specific aspects have been described in the specification and illustrated in the drawings, it will be understood by those skilled in the art that various changes can be made and equivalents can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components and/or functions of one aspect of the present teachings can be incorporated into another aspect, as appropriate, unless described otherwise above. Moreover, many modifications may be made to adapt a particular situation, configuration, or material to the present teachings without departing from the essential scope thereof. Therefore, it is intended that the present teachings not be limited to the particular aspects illustrated by the drawings and described in the specification as the best mode presently contemplated for carrying out the present teachings, but that the scope of the present teachings include many aspects and examples following within the foregoing description and the appended claims.

What is claimed is:
1. A vehicle driveline comprising:
an input shaft rotatable about a first axis;
a range sleeve that is concentric with the input shaft, the range sleeve being non-rotatably but slidably coupled to the input shaft and movable along the first axis between a first range sleeve position and a second range sleeve position;

a mode sleeve that is concentric with the input shaft, the mode sleeve being slidable along the first axis between a first mode sleeve position and a second mode sleeve position;

a planetary transmission having a planet carrier, a sun gear and a plurality of planet gears that are rotatably mounted on the planet carrier and meshingly engaged to the sun gear;

a differential assembly having a differential case and a differential gearset, the differential case being coupled to the planet carrier for common rotation about the first axis, the differential gearset being disposed in the differential case and including a pair of differential output members;

an axle shaft coupled for rotation with one of the differential output members, the axle shaft extending through the sun gear and the input shaft; and a power transfer unit having a PTU input and a PTU output, the PTU output being rotatable about a second axis that is transverse to the first axis;

wherein placement of the range sleeve in the first range sleeve position couples the planet carrier to the input shaft for common rotation and wherein placement of the range sleeve in the second range sleeve position couples the sun gear to the input shaft for common rotation;

wherein placement of the mode sleeve in the first mode sleeve position when the range sleeve is in the first range sleeve position de-couples the range sleeve from the PTU input to permit relative rotation between the range sleeve and the PTU input, and wherein placement of the mode sleeve in the second mode sleeve position when the range sleeve is in the first range sleeve position couples the range sleeve to the PTU input for common rotation.

2. The vehicle driveline of claim 1, wherein the PTU input is rotatable about the first axis.

3. The vehicle driveline of claim 1, wherein the PTU output comprises a bevel pinion gear that is meshingly engaged with a bevel ring gear.

4. The vehicle driveline of claim 3, wherein the bevel ring gear is rotatable about a third axis that is offset from but parallel to the first axis.

5. The vehicle driveline of claim 1, wherein the PTU input comprises a first intermediate gear, and wherein the first intermediate gear is meshed with a second intermediate gear that is mounted on an intermediate shaft.

6. The vehicle driveline of claim 1, wherein the range sleeve comprises a first set of mode sleeve teeth and a second set of mode sleeve teeth that are spaced apart from the first mode sleeve teeth, wherein the first set of mode teeth engage the mode sleeve when the mode sleeve is in the second mode sleeve position and the range sleeve is in the first mode sleeve position, and wherein the second set of mode sleeve teeth engage the mode sleeve when the mode sleeve is in the second mode sleeve position and the range sleeve is in the second range sleeve position.

7. The vehicle driveline of claim 1, further comprising a rear drive module that is driven by the PTU output.

8. The vehicle driveline of claim 7, wherein the rear drive module includes a two-speed transmission, which is driven by the PTU output, and a differential mechanism that is driven by an output of the two-speed transmission.

9. The vehicle driveline of claim 8, wherein the rear drive module further comprises an input pinion, which is coupled to the PTU output via a propshaft, and a clutch that selectively interrupts power transmission between a pair of rear axle shafts and the input pinion.

10. A vehicle driveline comprising:
an input shaft that is rotatable about a first axis;
a range sleeve that is concentric with the input shaft, the range sleeve being non-rotatably but axially slidably coupled to the input shaft;
a mode sleeve that is concentric with the input shaft;
a differential assembly having a differential case and a differential gearset, the differential case being rotatable about the first axis,
a two-speed transmission configured to receive rotary power from the range sleeve, the two-speed transmission outputting rotary power to the differential case; and
a power take-off unit having a PTU input and a PTU output, the PTU output being disposed along a second axis that is not parallel to the first axis;
wherein the two-speed transmission operates in a first speed ratio when the range sleeve is positioned in a first range sleeve position, wherein the two-speed transmission operates in a second speed ratio when the range sleeve is positioned in a second range sleeve position;
wherein the mode sleeve is movable between a first mode sleeve position, in which the mode sleeve is disengaged from at least one of the PTU input member and the range sleeve, and a second mode sleeve position in which the mode sleeve is located in a position where it is capable of transmitting rotary power between the range sleeve and the PTU input member; and
wherein movement of the range sleeve and the mode sleeve is coordinated to provide a two-wheel drive high range operational mode, a four-wheel drive high range operational mode and a four-wheel drive low range operational mode.

11. The vehicle driveline of claim 10, wherein the PTU input is rotatable about the first axis.

12. The vehicle driveline of claim 10, wherein the PTU output comprises a bevel pinion gear that is meshingly engaged with a bevel ring gear.

13. The vehicle driveline of claim 12, wherein the bevel ring gear is rotatable about a third axis that is offset from but parallel to the first axis.

14. The vehicle driveline of claim 10, wherein the PTU input comprises a first intermediate gear, and wherein the first intermediate gear is meshed with a second intermediate gear that is mounted on an intermediate shaft.

15. The vehicle driveline of claim 10, wherein the two-speed transmission is a planetary transmission.

16. The vehicle driveline of claim 10, wherein the range sleeve provides rotary power to a first element of the two-speed transmission when the range sleeve is in the first range sleeve position and wherein the range sleeve provides rotary power to a second element of the two-speed transmission when the range sleeve is in the second range sleeve position.

17. The vehicle driveline of claim 10, wherein the range sleeve comprises a first set of mode sleeve teeth and a second set of mode sleeve teeth that are spaced apart from the first mode sleeve teeth, wherein the first set of mode teeth engage the mode sleeve when the mode sleeve is in the second mode sleeve position and the range sleeve is in the first mode sleeve position, and wherein the second set of mode sleeve teeth engage the mode sleeve when the mode sleeve is in the second mode sleeve position and the range sleeve is in the second range sleeve position.

18. The vehicle driveline of claim 10, further comprising a rear drive module that is driven by the PTU output.

19. The vehicle driveline of claim 18, wherein the rear drive module includes a two-speed transmission, which is driven by the PTU output, and a differential mechanism that is driven by an output of the two-speed transmission.

20. The vehicle driveline of claim 19, wherein the rear drive module further comprises an input pinion, which is coupled to the PTU output via a propshaft, and a clutch that selectively interrupts power transmission between a pair of rear axle shafts and the input pinion.

* * * * *